(12) United States Patent
Lee et al.

(10) Patent No.: US 12,004,244 B2
(45) Date of Patent: Jun. 4, 2024

(54) METHOD AND MOBILE TERMINAL FOR CONTROLLING BLUETOOTH LOW ENERGY DEVICE

(71) Applicant: Samsung Electronics Co., Ltd., Suwon-si (KR)

(72) Inventors: Ju-youn Lee, Seongnam-si (KR); Sang-hyup Lee, Suwon-si (KR); Min-jeong Ko, Suwon-si (KR); Kwang-choon Kim, Suwon-si (KR); Jung-won Suh, Suwon-si (KR); Seung-hyuck Shin, Suwon-si (KR); Sung-jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/135,189

(22) Filed: Dec. 28, 2020

(65) Prior Publication Data

US 2021/0120603 A1 Apr. 22, 2021

Related U.S. Application Data

(63) Continuation of application No. 14/078,073, filed on Nov. 12, 2013, now Pat. No. 10,912,131.

(30) Foreign Application Priority Data

Dec. 3, 2012 (KR) .................. 10-2012-0139245
Mar. 13, 2013 (KR) .................. 10-2013-0026821

(51) Int. Cl.
*H04W 76/14* (2018.01)
*G06F 3/0482* (2013.01)
*H04W 4/70* (2018.01)

(52) U.S. Cl.
CPC .......... *H04W 76/14* (2018.02); *G06F 3/0482* (2013.01); *H04W 4/70* (2018.02)

(58) Field of Classification Search
None
See application file for complete search history.

(56) References Cited

U.S. PATENT DOCUMENTS 6,041,044 A 3/2000 Seiffert et al.
7,283,258 B1 10/2007 Kuno et al.
(Continued)

FOREIGN PATENT DOCUMENTS

CN 1549543 A 11/2004
CN 1964205 A 5/2007
(Continued)

OTHER PUBLICATIONS

"Developing a Bluetooth Low Energy Application", (Publication Date: Mar. 2, 2003. Publisher: Texas Instruments. URL: https://software-dl.ti.com/simplelink/esd/simplelink_cc13x0_sdk/2.20.00.38/exports/docs/blestack/software-developers-guide/ble-stack-2.x/index.html#le-privacy-1-2.*

(Continued)

*Primary Examiner* — Matthew Ell
*Assistant Examiner* — David V Luu
(74) *Attorney, Agent, or Firm* — Jefferson IP Law, LLP

(57) ABSTRACT

A method of controlling, by using a mobile terminal, at least one Bluetooth Low Energy (BLE) device is provided. The method includes searching for at least one BLE device, displaying a BLE device list, including the at least one searched for BLE device, on a display unit of the mobile terminal, receiving an input of selection of a BLE device from the BLE device list, receiving an input of user added information from a user regarding the selected BLE device, (Continued)

and mapping and storing property information and the user added information regarding the selected BLE device.

19 Claims, 26 Drawing Sheets

(56) References Cited

U.S. PATENT DOCUMENTS

| | | | |
|---|---|---|---|
| 7,778,602 | B2 | 8/2010 | Kim |
| 8,244,179 | B2 | 8/2012 | Dua |
| 9,699,269 | B2 | 7/2017 | Hooft |
| 2005/0086332 | A1 | 4/2005 | Nakazawa |
| 2005/0270234 | A1 | 12/2005 | Wolf et al. |
| 2006/0019720 | A1 | 1/2006 | Kakehi |
| 2006/0165100 | A1* | 7/2006 | Huang ............... H04W 64/00 370/328 |
| 2006/0258289 | A1 | 11/2006 | Dua |
| 2007/0105500 | A1 | 5/2007 | Kim |
| 2007/0197164 | A1 | 8/2007 | Sheynman et al. |
| 2008/0085745 | A1 | 4/2008 | Ozaki |
| 2008/0176516 | A1 | 7/2008 | Kim |
| 2008/0314434 | A1 | 12/2008 | Khouri et al. |
| 2009/0061769 | A1 | 3/2009 | Zimbric et al. |
| 2009/0187382 | A1* | 7/2009 | Conroy ............. G05B 23/0267 702/188 |
| 2010/0060658 | A1 | 3/2010 | Fujii et al. |
| 2010/0306418 | A1 | 12/2010 | Anson et al. |
| 2011/0040757 | A1 | 2/2011 | Kossi et al. |
| 2011/0117848 | A1 | 5/2011 | Tanaka |
| 2011/0143666 | A1 | 6/2011 | Lee |
| 2011/0255454 | A1 | 10/2011 | Hauser et al. |
| 2011/0270947 | A1 | 11/2011 | Cok et al. |
| 2012/0117661 | A1* | 5/2012 | Kao ................... H04W 64/00 370/328 |
| 2012/0123224 | A1 | 5/2012 | Packer et al. |
| 2012/0169502 | A1* | 7/2012 | Huang ................ A61B 5/6804 340/573.1 |
| 2012/0171951 | A1 | 7/2012 | Hooft |
| 2012/0212505 | A1 | 8/2012 | Burroughs et al. |
| 2012/0253480 | A1 | 10/2012 | Abe |
| 2012/0278023 | A1* | 11/2012 | Han ................... G01C 21/1654 702/141 |
| 2012/0289160 | A1 | 11/2012 | Palin et al. |
| 2012/0314623 | A1* | 12/2012 | Pesonen .............. H04W 40/32 370/254 |
| 2013/0035950 | A1 | 2/2013 | Macdonald et al. |
| 2013/0059534 | A1 | 3/2013 | Sobalvarro et al. |
| 2013/0131524 | A1* | 5/2013 | Chen .................. A61B 5/6805 600/493 |
| 2013/0259230 | A1* | 10/2013 | Polo .................. H04L 63/0272 380/270 |
| 2014/0023556 | A1* | 1/2014 | Jiang .................. C01B 13/10 422/111 |
| 2018/0212684 | A1 | 7/2018 | Aoyama et al. |

FOREIGN PATENT DOCUMENTS

| | | |
|---|---|---|
| CN | 101867383 A | 10/2010 |
| CN | 102299729 A | 12/2011 |
| CN | 102457558 A | 5/2012 |
| CN | 102299729 A | 7/2012 |
| CN | 102624430 A | 8/2012 |
| CN | 102736526 A | 10/2012 |
| CN | 103416047 A | 11/2013 |
| EP | 1 480 394 B1 | 4/2007 |
| EP | 1 783 958 A1 | 5/2007 |
| EP | 2 226 713 A1 | 9/2010 |
| JP | 10-503907 A | 4/1998 |
| JP | 2002-290606 A | 10/2002 |
| JP | 2005-268941 A | 9/2005 |
| JP | 2008-46757 A | 2/2008 |
| JP | 2010-11064 A | 1/2010 |
| JP | 2012-185742 A | 9/2012 |
| KR | 10-2007-0063117 A1 | 6/2007 |
| KR | 10-2008-0104125 A | 12/2008 |
| KR | 10-2010-0021005 A | 2/2010 |
| KR | 10-2010-0077687 A1 | 7/2010 |
| KR | 10-2010-0096409 A1 | 9/2010 |

OTHER PUBLICATIONS

Chinese Office Action with English translation dated Mar. 5, 2021; Chinese Appln. No. 201810595101.6.
Bluetooth Specification Version 4.0, vol. 0, Jun. 30, 2010.
Silicon Laboratories Inc.; "Blegui Application, User Guide"; Silicon Labs; Oct. 15, 2012; pp. 1-31; Version 1.7; Austin, Texas.
European Patent Office; European Office Action dated Sep. 20, 2018 in Application No. 18192115.6-1218.
Korean Office Action with English translation dated Mar. 13, 2019; Korean Appln. No. 10-2013-0026821.
Japanese Office Action with English translation dated May 27, 2019; Japanese Appln. No. 2018-144946.
Japanese Office Action with English translation; draft date Nov. 7, 2019; dated Nov. 11, 2019; Japanese Appln. No. 2018-144946.
Chinese Office Action with English translation dated Jul. 15, 2020; Chinese Appln. No. 201810595101.6.
Chinese Notice of Allowance with English translation dated Mar. 2, 2022; Chinese Appln. No. 201810595101.6.

* cited by examiner

FIG. 11C
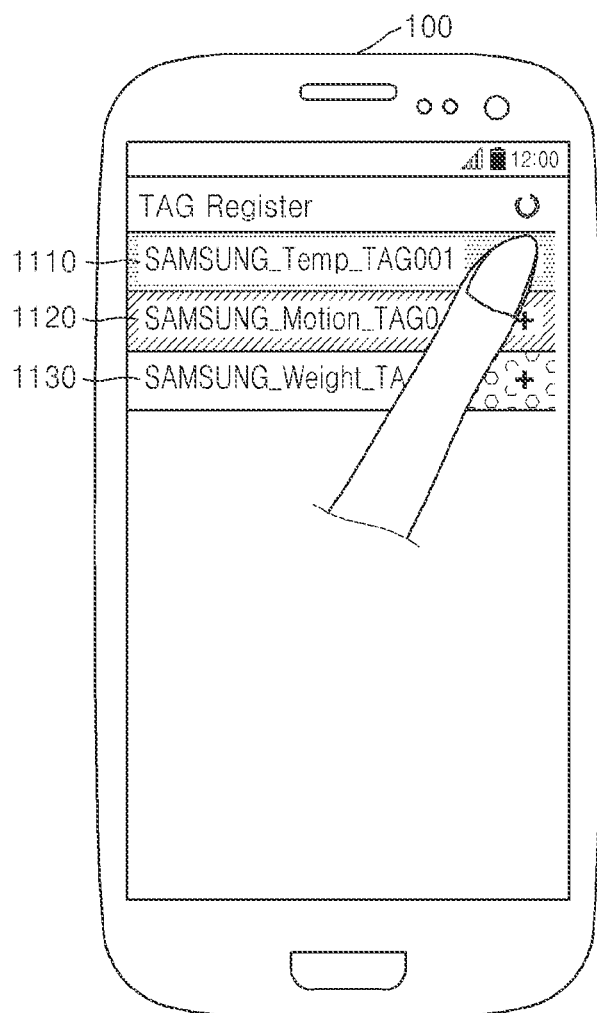
SAMSUNG_Temp_TAG001_blue
 —1110
SAMSUNG_Motion_TAG002_sky
 —1120
SAMSUNG_Weigh_TAG003_red
 —1130

FIG. 18

| Value (1810) | Data Type Name (1820) | Definition (1830) |
|---|---|---|
| 0x01 | «Flags» | (0) LE Limited Discoverable Mode<br>(1) LE General Discoverable Mode<br>(2) BR/EDR Not Supported<br>(3) LE AND BR/EDR SIMULTANEOUS AVAILABILITY (Controller)<br>(4) LE AND BR/EDR SIMULTANEOUS AVAILABILITY (Host) |
| 0x02 | «Incomplete List of 16-bit Service Class UUIDs» | More 16-bit UUIDs available |
| 0x03 | «Complete List of 16-bit Service Class UUIDs» | Complete list of 16-bit UUIDs available |
| 0x04 | «Incomplete List of 32-bit Service Class UUIDs» | More 32-bit UUIDs available |
| 0x05 | «Complete List of 32-bit Service Class UUIDs» | Complete list of 32-bit UUIDs available |
| 0x06 | «Incomplete List of 128-bit Service Class UUIDs» | More 128-bit UUIDs available |
| 0x07 | «Complete List of 128-bit Service Class UUIDs» | Complete list of 128-bit UUIDs available |
| 0x08 | «Shortened Local Name» | |
| 0x09 | «Complete Local Name» | Max 248 bytes, 82 characters |
| 0x0A | «Tx Power Level» | 0xXX:-127 to +127dBm |
| 0x0D | «Class of Device» | Optional OOB Tags |
| 0x0E | «Simple Pairing Hash C» | Optional OOB Tags |
| 0x0F | «Simple Pairing Randomizer R» | Optional OOB Tags |
| 0x10 | «Device ID» | |
| 0x10 | «Security Manager TK Value» | Temporary Key (TK): a 128-bit temporary key used in the pairing process |
| 0x11 | «Security Manager Out of Band Flags» | (0) OOB data not present = 0, present = 1<br>(1) LE supported (Host)<br>(2) LE AND BR/EDR SIMULTANEOUS AVAILABILITY (Host)<br>(3) Address type (0=Public, 1=Random) |
| 0x12 | «Slave Connection Interval Range» | Conn_Interval_Min and Conn_Interval_Max<br>(range : 0x0006 to 0x0C80, 7.5ms ~ 4s) |
| 0x14 | «List of 16-bit Service Solicitation UUIDs» | REQUEST FOR LIST OF 16 BIT SERVICE UUIDs SERVICE |
| 0x15 | «List of 128-bit Service Solicitation UUIDs» | REQUEST FOR LIST OF 128 BIT SERVICE UUIDs SERVICE |
| 0x16 | «Service Data» | 16 bit Service UUID + Service Data |
| 0x17 | «Public Target Address» | |
| 0x18 | «Random Target Address» | |
| 0x19 | «Appearance» | |
| 0xFF | «Manufacturer Specific Data» | Company ID Code + MSD |

FIG. 19A

| NECESSARY AD TYPE | Byte | PURPOSE | EMBODIMENT |
|---|---|---|---|
| TX Power Level | 1 | MEASURE PREDETERMINED DISTANCE(Signal Strength) pathloss = TX PL − Adv_RSSI | TX Power level = +4 (dBm) RSSI on Adv packet = −60 (dBm) passloss = +65 dB |
| Shortened Local Name | 29 | Broadcast Name or Msg | REPLACEMENT TO SCAN RESPONSE IS POSSIBLE ex) GT-N8000, Samsung Mobile |
| Class of Device (Cod) | 3 | Major Device Class Minor Device Class Service Class (24bit bit-mask) | ex) CoD = Major : Phone Minor : Smart phone Service : Object Transfer |
| Random Target Address | 6 | 48-bit address | ex) PREDEFINED ADDRESS SUCH AS SAMSUNG MOBILE, STARBUCKS, ETC. IS USED |
| List of Service Solicitation UUIDs | 2 | May be sent to invite | ex) 0x1105 <<Object Push Profile>> 0x1106 <<File Transfer Profile>> |
| Manufacturer Specific Data <<Protocol>> | 4 | Company Identifier Code and Protocol Identifier Code | {0x0075} Samsung Electronics (0x0201) SSSP 1.1 |
| Manufacturer Specific Data <<Capability>> | 2 | Capability State (16bit bit-mask) | <<Communcation Bitmasks>> (01) Bluetooth BR/EDR (02) Bluetooth AMP (03) Bluetooth LE (04) WiFi (05) WiFi Direct (06) WiFi Display (07) DLNA (All-Share) (08) NFC, RFID (09) ZigBee, RF4CE |

FIG. 19B

| NECESSARY AD TYPE | Byte | PURPOSE | EMBODIMENT |
|---|---|---|---|
| Manufacturer Specific Data <<Capability>> | 2 | Capability State (16bit bit-mask) | (10) Ant. Ant+ <br> (11) Proprietary 2.4Ghz <br> (12) Sub-1Ghz <br> (13~16) Reserved <br> ex) 0x00FF (01~08 Supported) |
| Manufacturer Specific Data <<Sensor>> | 8 | Sensor ID and Value | <<Sensor Raw Value>> <br> (01) GPS <br> 02) Accelerometer <br> (03) Gyroscope <br> (04) Geomagnetic <br> (05) Pressure <br> (06) Temperature <br> (07) Humidity <br> (08) Grip <br> (09) Proximity <br> (10) Light <br> ex) 0x06000024 (Temperature 36°C) |
| Manufacturer Specific Data <<Others>> | 2 | Phone State | <<Phone State Bitmasks>> <br> (01) Silent mode <br> (02) Screen Rotation <br> (03) Power Saving <br> (04) Notification <br> (05) Mobile Data <br> (06) Driving mode <br> (07) Sync mode <br> (08) Privacy/Flight mode <br> (09~16) Reserved |

FIG. 20

AdvData: 0x0000FFFF040201FF030075FF03840A02303030384E5F54710809040102 (29 Bytes)
① ② ③ ④ ⑤ ⑥

| 02 01 04 | 09 08 71 54 5F 4E 38 30 30 30 | 02 0A 84 | 03 FF 75 00 | 03 FF 01 02 | 04 FF FF 00 00 |
|---|---|---|---|---|---|

① ↘ Flags
② ↘ Shortened Local Name
    G T _ N 8 0 0 0
③ ↘ Tx Power Level=132 (+4dBm)
④ ↗ [MSD]Company ID (0x0075)
⑤ ↗ [MSD]Protocol ID (0x0201)
⑥ [MSD]Capability State (0x0000FF)

METHOD AND MOBILE TERMINAL FOR CONTROLLING BLUETOOTH LOW ENERGY DEVICE

CROSS-REFERENCE TO RELATED PATENT APPLICATION(S)

This application is a continuation application of prior application Ser. No. 14/078,073, filed on Nov. 12, 2013, which claims priority under 35 U.S.C. § 119(a) of a Korean patent application filed on Dec. 3, 2012, in the Korean Intellectual Property Office and assigned Serial No. 10-2012-0139245, and under 35 U.S.C. § 119(a) of a Korean patent application filed on Mar. 13, 2013 in the Korean Intellectual Property Office and assigned Serial No. 10-2013-0026821, the entire disclosures of each of which are hereby incorporated by reference.

TECHNICAL FIELD

The present disclosure relates to a method and a mobile terminal for controlling a device which supports a Bluetooth Low Energy (BLE) function.

BACKGROUND

Bluetooth technology enables short-range wireless communication, rather than having to use cables to connect devices to each other. For example, when the Bluetooth wireless technology is implemented in a cellular phone or a laptop computer, the cellular phone or the laptop computer may be connected to a wireless communication network without having to make a cable connection. All types of digital devices, including printers, Personal Digital Assistants (PDAs), desktop computers, fax machines, keyboards, and joysticks, can be a part of a Bluetooth system. In addition to removing the necessity of making cable connections, the Bluetooth wireless technology can also be used to form an interface between an existing data network and peripheral devices and form a special group between devices which are located far from a fixed network infrastructure. The Bluetooth technology provides a robust wireless connection based on quick recognition and by using a frequency hopping method. A Bluetooth module avoids interference with other signals by hopping to a new frequency after the transmission or reception of a packet. Compared to other systems which operate within the same frequency range, the Bluetooth technology uses an especially short and fast packet. Since Bluetooth version 4.0, which includes all of the functions provided by Classic Bluetooth, Bluetooth high speed, and Bluetooth Low Energy (BLE), was released, there has been a growing interest in the BLE technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a mobile terminal for efficiently controlling a Bluetooth Low Energy (BLE) device during registration of the BLE device, by displaying property information on the BLE device in a list, and mapping and registering user added information from a user on the BLE device, which is input by the user, and the BLE device.

In accordance with an aspect of the present disclosure, a method of controlling a BLE device, by using a mobile terminal, is provided. The method includes searching for at least one BLE device, displaying a BLE device list, including the at least one searched for BLE device, on a display unit of the mobile terminal, receiving an input of selection of a BLE device from the BLE device list, receiving an input of user added information from a user regarding the selected BLE device, and mapping and storing property information and the user added information regarding the selected BLE device.

The searching for the at least one BLE device includes receiving IDentification (ID) information, which includes property information, from the at least one BLE device.

The property information may include at least one of color information, shape information, image information, and sensor information regarding the at least one BLE device.

The displaying of the BLE device list may further include receiving color information from the at least one BLE device, and displaying the BLE device list by applying color to the BLE device which has transmitted the color information.

The displaying of the BLE device list may include extracting one or more BLE devices, which are unregistered in the mobile terminal, from among the at least one BLE device, and displaying a list of the extracted one or more unregistered BLE devices.

The displaying of the BLE device list may include comparing information about the at least one BLE device to information about stored registered BLE devices, and based on a result of the comparing, displaying unregistered BLE devices and the registered BLE devices separately on the BLE device list.

The user added information may include at least one of an ID, a nickname, a category, a memo, and notification information, which are input by a user with regard to the selected BLE device.

The receiving of an input of the user added information from the user includes obtaining an image of an object, which corresponds to the selected BLE device, through a camera.

The method may include displaying a registered BLE device list of one or more BLE devices which are registered in the mobile terminal, receiving a selection made by the user of at least one registered BLE device from the registered BLE device list, and providing profile information which includes user added information input from the user regarding the selected registered BLE device.

The providing of the profile information may further include receiving sensing information detected by the selected registered BLE device from the selected registered BLE device for a predetermined period, and displaying the received sensing information.

The providing of the profile information may further include determining information about a distance between the selected registered BLE device and the mobile terminal, based on a strength of a signal received from the selected registered BLE device, and displaying the determined distance information.

The method may further include updating the profile information regarding the selected registered BLE device.

In accordance with another aspect of the present disclosure, a mobile terminal is provided. The mobile terminal includes a communication unit for searching for at least one BLE device, a display unit for displaying a BLE device list including the at least one searched for BLE device, a user input unit for receiving an input of a selection of a BLE device from the BLE device list and receiving an input of user added information from user regarding the selected BLE device, and a control unit for mapping and storing property information and the user added information regarding the selected BLE device in a memory.

The communication unit may receive identification information, which includes property information, from among the searched for at least one BLE device.

The communication unit may receive color information from the searched for at least one BLE device, and the display unit may display the BLE device list by applying color to the BLE device which has transmitted the color information.

The control unit may extract one or more BLE devices, which are not registered in the mobile terminal, from among the searched for at least one BLE device, and may display a list of the extracted one or more unregistered BLE devices in the display unit.

The control unit may compare information about the searched for at least one BLE device to information about registered stored BLE devices, and based on a result of the comparing, displays unregistered BLE devices and the registered BLE devices separately on the BLE device list.

The user added information may include an image of an object which corresponds to the selected BLE device.

The control unit may obtain the image of the object through a camera, based on a user input.

The display unit may display a registered BLE device list of one or more BLE devices which are registered in the mobile terminal, the user input unit may receive an input of a selection made by the user of at least one registered BLE device from the registered BLE device list, and the control unit may provide profile information which includes user added information input from the user regarding the selected registered BLE device.

The communication unit may receive sensing information detected by the selected registered BLE device from the selected registered BLE device for a predetermined period, and the display unit may display the received sensing information.

The control unit may determine information about a distance between the selected registered BLE device and the mobile terminal, based on the strength of a signal received from the selected registered BLE device, and the display unit may display the determined distance information.

The control unit may update profile information regarding the selected registered BLE device.

In accordance with yet another aspect of the present disclosure, a method of controlling at least one BLE device, by a using mobile terminal, is provided. The method includes searching for at least one BLE device, displaying a BLE device list including the at least one BLE device on a display unit of the mobile terminal, receiving an input selection of a BLE device from the BLE device list, receiving an input of notification information regarding the selected BLE device, and mapping and storing the selected BLE device and the notification information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIGS. 11A, 11B, and 11C are diagrams illustrating the list of the BLE devices including the sensor information, according to an embodiment of the present disclosure;

FIG. 18 is a table for explaining an Advertising Data (AD) type, according to an embodiment of the present disclosure;

FIGS. 19A and 19B are a table for explaining data broadcast by a BLE device, according to an embodiment of the present disclosure; and FIG. 20 is a diagram illustrating an example of an AD packet according to an embodiment of the present disclosure.

Throughout the drawings, it should be noted that like reference numbers are used to depict the same or similar elements, features, and structures.

DETAILED DESCRIPTION

Figure 1:
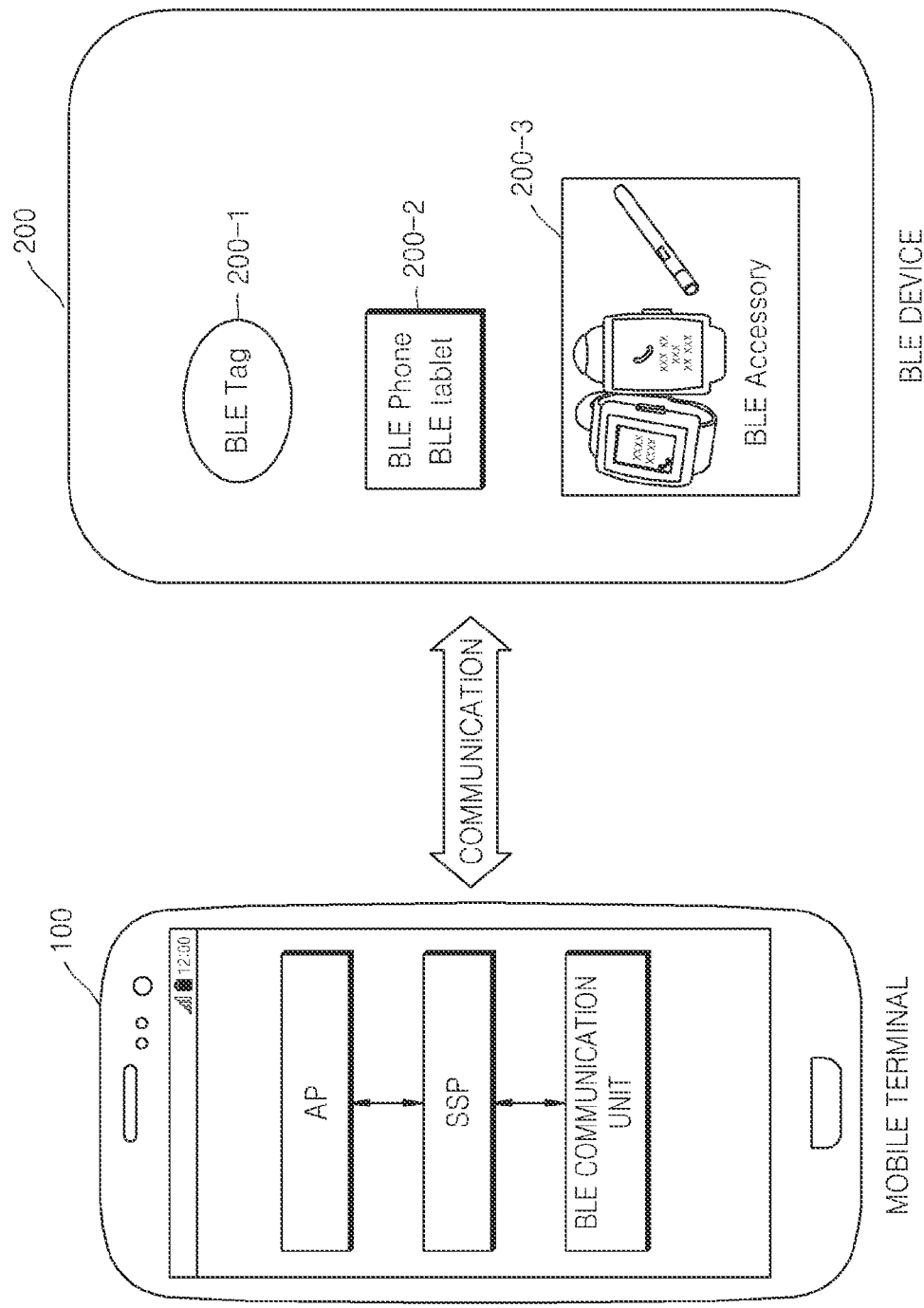
FIG. 1 is a diagram illustrating a Bluetooth Low Energy (BLE) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and the present disclosure will be described in detail below.

General and widely-used terms have been employed herein, in consideration of functions provided in the present disclosure, and may vary according to an intention of one of ordinary skill in the art, a precedent, or emergence of new technologies. Additionally, in some cases, an applicant may arbitrarily select specific terms. Then, the applicant will provide the meaning of the terms in the description of the present disclosure. Accordingly, It will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

Bluetooth Low Energy (BLE), in the description of the present disclosure, is a short-range wireless communication technology and is a key function of Bluetooth version 4.0. The BLE has a relatively small duty cycle, compared to classic Bluetooth. The BLE may be produced at low cost and may operate using a coin-sized battery for several years by reducing average power and standby power.

A communication range of a BLE device, according to an embodiment of the present disclosure, means a distance in which a mobile terminal may receive data which may be broadcast from the BLE device in the form of an advertising packet. For example, the distance may be 50 m to 100 m. Additionally, the communication range of the BLE device may be arbitrarily set by a user. For example, the user may set a certain area, such as a living room, a kitchen, or an entire house, as the communication range of the BLE device. Or the user may set a certain distance, for example, 5 m, as the communication range of the BLE device.

An application, as referred to in the description of the present disclosure, is a set of computer programs designed for executing a particular operation or job. Applications provided in the description of the present disclosure may vary. For example, the applications provided in the description of the present disclosure may include a schedule management application, an address application, a video playback application, a map application, a fitness application, a payment application, a baby care application, a healthcare application, and an e-book application, but is not limited thereto.

The present disclosure will now be described more fully with reference to the accompanying drawings, in which various embodiments of the disclosure are shown. The disclosure may, however, be embodied in many different forms and should not be construed as being limited to the embodiments set forth herein. In the description of the present disclosure, certain detailed explanations of the related art are omitted when it is deemed that they may unnecessarily obscure the essence of the disclosure. Like numbers refer to like elements throughout the description of the figures.

FIG. 1 is a diagram illustrating a BLE communication system according to an embodiment of the present disclosure.

Referring to FIG. 1, the BLE communication system, according to an embodiment of the present disclosure, may include a mobile terminal 100 and a BLE device 200.

The mobile terminal 100 may be a terminal for providing a user with a predetermined service via BLE communication with the external BLE device 200. For example, the mobile terminal 100 may register and manage information about the external BLE device 200, for example, IDentification (ID) information, in a memory. Additionally, the mobile terminal 100 may provide various other services such as a reminder service, a mode change service, and a remote control service, via the BLE communication with the external BLE device 200. Each service will be described in detail later.

The mobile terminal, according to an embodiment of the present disclosure, may be implemented in various forms. For example, the mobile terminal 100 may be a cellular phone, a smart phone, a laptop computer, a tablet Personal Computer (PC), an e-book terminal, a digital broadcasting terminal, a Personal Digital Assistant (PDA), a Portable Multimedia Player (PMP), or a navigation system, but is not limited thereto.

In the mobile terminal 100 according to an embodiment of the present disclosure, a Seamless Sensing Platform (SSP) may operate independently from an Application Process (AP). The mobile terminal 100 may collect information about the BLE device 200 and recognize a context by connecting a sensor hub of the SSP to a BLE communication unit without needing to wake the AP from a sleep mode. In the case of a predetermined situation, the SSP may wake the AP from the sleep mode. The SSP, the AP, and the BLE communication unit, according to an embodiment of the present disclosure, may be implemented by hardware, software, or a combination of hardware and software. This will be described in detail later, by referring to FIG. 3.

The BLE device 200 may broadcast identification information via BLE communication. The BLE device 200 may broadcast the identification information in a format of an advertising packet. The BLE device 200, according to an embodiment of the present disclosure, may broadcast sensing information, obtained by a sensor, to the outside. For example, the BLE device 200 may include identification information (for example, "SAMSUNG_Temp_TAG001_blue") in a Universally Unique Identifier (UUID) field of the advertising packet or in a Manufacturer Specific Data (MSD) field thereof, and may broadcast the identification information to the outside. A detailed description of the BLE device 200 broadcasting data in advertising packet form will be provided later with reference to FIGS. 17, 18, 19, through 20. For convenience of description, hereinafter, the BLE device 200 which includes a sensor is referred as a sensor-based BLE device 200.

The BLE device 200, according to an embodiment of the present disclosure, may broadcast the sensing information detected by the BLE device 200 for a certain period of time. If the sensing information is updated or when a specific event is generated, the BLE device 200 may also broadcast the sensing information by using an event trigger method.

Additionally, the BLE device 200, according to an embodiment of the present disclosure, may broadcast the identification information in the format of an advertising packet. The sensing information detected by the BLE device 200 may be transmitted to the mobile terminal 100 via a communication channel after the BLE device 200 is paired with the mobile terminal 100. For security of the sensing information, the BLE device 200 according to an embodiment of the present disclosure may encrypt the sensing information by using a negotiated encryption key or a predefined encryption key, and transmit the encrypted sensing information to the mobile terminal 100.

Figure 4A:
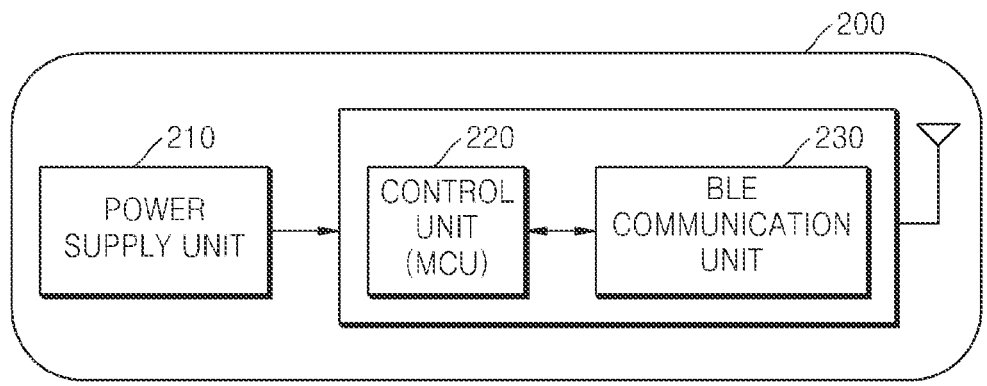
FIGS. 4A and 4B are block diagrams illustrating a BLE device according to an embodiment of the present disclosure.
Figure 4B:
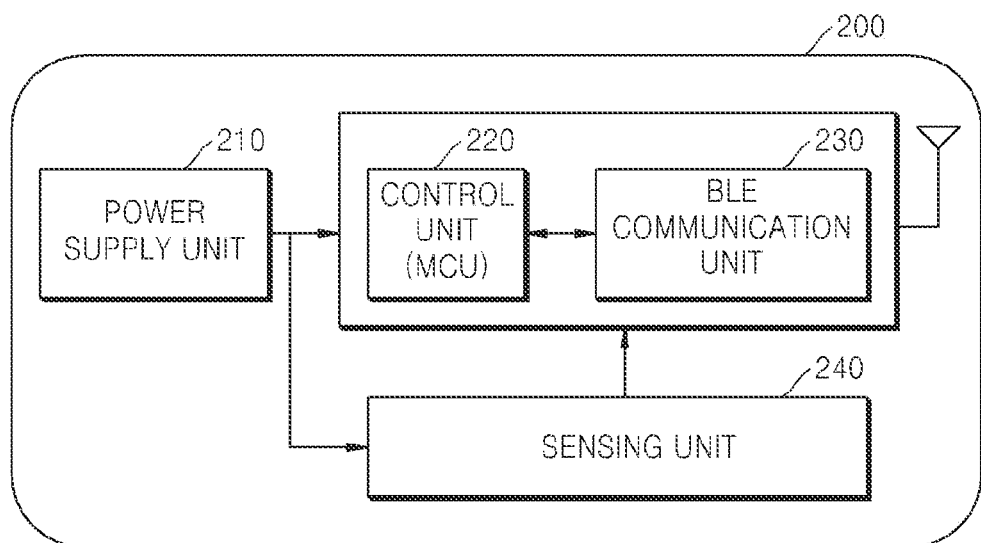

The BLE device 200 according to an embodiment of the present disclosure may be implemented in various forms. For example, the BLE device 200 described in the present disclosure may be implemented in a format of a simple BLE tag 200-1, mobile equipment 200-2 such as a BLE phone or a BLE tablet PC, or an accessory 200-3 such as a BLE wristwatch or a BLE earphone. The configuration of the BLE device 200 will be described later by referring to FIGS. 4A and 4B, FIG. 2 is a block diagram illustrating the mobile terminal 100 according to an embodiment of the present disclosure.

Figure 2:
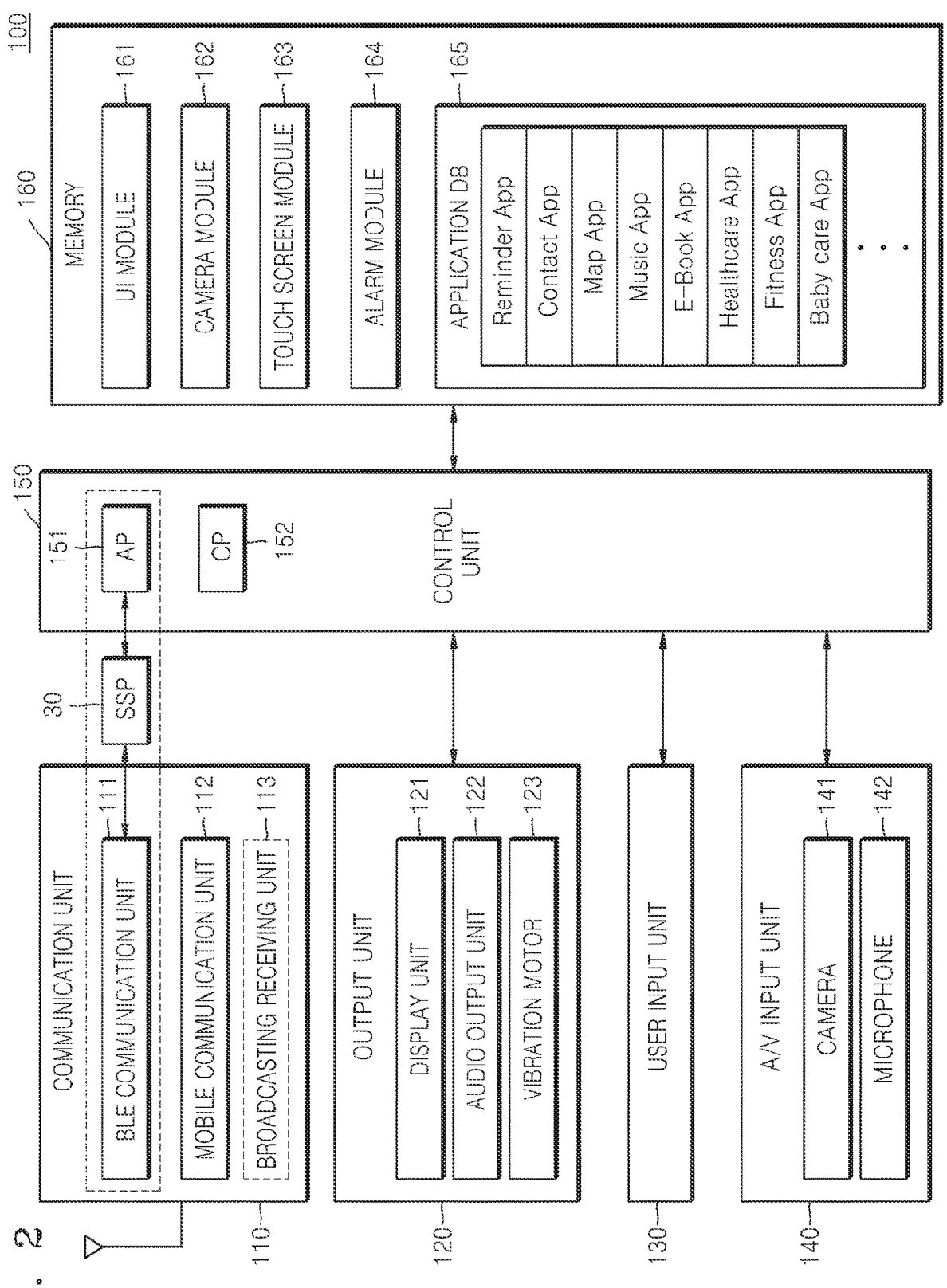
FIG. 2 is a block diagram illustrating a mobile terminal according to an embodiment of the present disclosure.

Referring to FIG. 2, the mobile terminal 100, according to an embodiment of the present disclosure, may include a communication unit 110, an output unit 120, a user input unit 130, an Audio-Video (A/V) input unit 140, a control unit 150, and a memory 160. However, the illustrated units are not always essential elements of the present disclosure. The mobile terminal 100 may be implemented by using more or fewer units than those shown in FIG. 2.

Hereinafter, the above-stated units will be described.

The communication unit 110 may include one or more units for communication between the mobile terminal 100 and the BLE device 200 or between the mobile terminal 100 and a server. For example, the communication unit 110 may include a BLE communication unit 111, a mobile communication unit 112, and a broadcasting receiving unit 113.

The BLE communication unit 111 supports a BLE communication function. For example, the BLE communication unit 111 may receive a signal which is broadcast from the external BLE device 200 in the form of an advertising packet. The BLE communication unit 111 may scan the BLE device 200 for a predetermined period of time or upon a request from a user.

The BLE communication unit 111 may be connected to an SSP 30. The SSP 30 may include (not shown) a sensor hub and an SSP manager. The sensor hub is a type of Micro Controller Unit (MCU) and may be connected to various types of sensors. The sensor hub, according to an embodiment of the present disclosure, may be connected to the BLE communication unit 111, and collect information about the external BLE device 200 via the BLE communication unit 111. The SSP manager may receive data from the sensor hub and wake up an Application Processor (AP) 151 in the control unit 150 from a sleep mode based on the data received from the sensor hub. The SSP 30 will be described later by referring to FIG. 3.

The communication unit 110 may also support other short-range wireless communication functions, in addition to the BLE communication function. Short-range wireless technology may include a wireless Local Area Network (LAN) which could be a Wi-Fi, Bluetooth, Zigbee, WiFi direct (WFD), Near Field Communication (NFC), Ultra WideBand (UWB), or Infrared Data Association (IrDA) network, but is not limited thereto.

The mobile communication unit 112 transmits and receives a wireless signal to and from with at least one of a base station, an external terminal, and a server on a mobile communication network. The wireless signals may include a voice call signal, a video phone call signal or various forms of data used to transmit and receive text or multimedia messages.

The broadcasting receiving unit 113 receives broadcasting signals and/or broadcasting-related information from outside, via a broadcasting channel. The broadcasting channel may include a satellite channel and a terrestrial broadcast channel. According to various embodiments, the mobile terminal 100 may optionally include a broadcasting receiving unit 113.

The output unit 120 functions to output an audio signal, a video signal, or a vibration signal, and may include a display unit 121, an audio output unit 112, and a vibration motor 123.

The display unit 121 displays and outputs information processed by the mobile terminal 100. For example, while in a phone call mode, the display unit 121 may display a User Interface (UI) or a Graphic User Interface (GUI) related to the phone call. Otherwise, while in a mode of searching for the BLE device 200, the display unit 121 may display a list of the searched for BLE devices. The display unit 121 may also display BLE devices which are registered in the mobile terminal 100, separately from those which are not registered in the mobile terminal 100.

Additionally, while in a setting mode of the BLE device 200, the display unit 121 may display a UI or a GUI, regarding a setting of the BLE device 200. While in a photographing mode, the display unit 121 may display a captured image.

If the display unit 121 and a touch pad form a layered structure to constitute a touch screen, the display unit 121 may be also used as an input device as well as an output unit. The display unit 121 may include at least one from among a Liquid Crystal Display (LCD), a Thin-Film Transistor-LCD (TFT-LCD), an Organic Light-Emitting Diode (OLED), a flexible display, a 3-Dimensional (3D) display, and an electrophoretic display. According to an implementation type of the mobile terminal 100, the mobile terminal 100 may include two or more display units 121. The two or more display units 121 may be disposed to face each other by using a hinge.

The audio output unit 122 outputs audio data which is received from the communication unit 110 or stored in the memory 160. The audio output unit 122 outputs an audio signal related to functions performed at the mobile terminal 100, for example, a call signal reception sound, a message reception sound, etc. The audio output unit 122 may include (not shown) a speaker, a buzzer, and so on.

The vibration motor 123 may output a vibration signal. For example, the vibration motor 123 may output a vibration signal which corresponds to an output of audio data or video data, for example, a call signal reception sound, a message reception sound, etc. Additionally, the vibration motor 123 may output a vibration signal, if a touch is input to a touch screen.

The user input unit 130 is a unit for inputting data so that the user may control the mobile terminal 100. For example, the user input unit 130 may include a key pad, a dome switch, a touch pad (which may be a capacitive overlay type, a resistive overlay type, an infrared beam type, a surface acoustic wave type, an integral strain gauge type, or a piezo electric type), a jog wheel, or a jog switch, but is not limited thereto.

The A/V input unit 140 functions to input audio or video signals, and may include a camera 141 and a microphone 142. The camera 141 may obtain an image frame such as a still image or a moving image through an image sensor, in a video phone mode or a photographing mode. An image captured through the image sensor may be processed through the control unit 150 or an additional image processing unit (not illustrated). The processed image frame may be displayed in the display unit 121, stored in the memory 160, or transmitted to the outside through the communication unit 110. The A/V input unit 140 may include two or more cameras 141 according to a configuration type of the mobile terminal 100.

The microphone 142 receives external sound signals in a telephone mode, a recording mode, or a voice recognition mode, and processes the external sound signals into electrical voice data. If in a telephone mode, the processed voice data may be converted into a transmittable form and output to the mobile communication base station via the mobile communication unit 112.

The control unit 150 controls all operations of the mobile terminal 100. That is, the control unit 150 executes programs stored in the memory 160 so as to control the communication unit 110, the output unit 120, the user input unit 130, the A/V input unit 140, and the memory 160.

The control unit 150 may include the AP 151 and a Communication Processor (CP) 152. The AP 151 may control execution of various applications which are stored in the memory 160. For example, if identification information of the BLE device 200 is received, the AP 151 may extract and execute an application for executing a control command which corresponds to the received identification information. The communication processor 152 may control various communication functions.

The control unit 150, according to an embodiment of the present disclosure, may map and register property information regarding the BLE device 200 and user added information, which is input from a user, and manage the registered information. Additionally, the control unit 150 may compare identification information about a searched for BLE device to a list of registered BLE devices which are stored in the memory 160. Thus, the control unit 150 may extract a BLE device, which is not registered in the mobile terminal 100, from among the searched for BLE devices. Based on the user input, the control unit 150 may capture an image of an object, for example, an image of the BLE device 200 or an image of an object or place to which the BLE device 200 is attached, by using the camera 141.

Additionally, the control unit 150 may obtain information about a distance between the BLE device 200 and the mobile terminal 100, by using the strength of a signal received from the BLE device 200. For example, the control unit 150 may obtain the distance between the BLE device 200 and the mobile terminal 100 by using information about a relationship between the strength of the received signal and the distance.

The memory 160 may store a program for processing and controlling the control unit 150. The memory 160 may also store data, which is received, input, or generated, such as identification information of the BLE device, property information regarding the BLE device, user added information input from a user, and sensing information obtained by a sensor included in the BLE device.

The memory 160 may include at least one storage medium from among a flash memory, a hard disk, a multimedia card micro, a card-type memory such as a Secure Digital (SD) or Extreme Digital (XD) memory, a Random Access Memory (RAM), a Static RAM (SRAM), a Read-Only Memory (ROM), an Electrically Erasable Programmable ROM (EEPROM), a Programmable ROM (PROM), a magnetic memory, a magnetic disc, and an optical disc. Additionally, the mobile terminal 100 may operate web or cloud storage for performing a storage function of the memory 160 on a network such as the internet.

The programs stored in the memory 160 may be classified into a plurality of modules according to functions. For example, the programs may be classified into a UI module 161, a camera module 162, a touch screen module 163, and an alarm module 164.

The UI module 161 may provide a specialized UI or GUI which interworks with the BLE device 200 according to applications. The camera module 162 may capture and process an image of an object which corresponds to the BLE device 200. Functions of the UI module 161 and the camera module 162 will be understood from the names of the modules by those of ordinary skill in the art. Thus, a detailed description thereof will not be provided here.

The touch screen module 163 may detect a touch gesture on a touch screen by a user and transmit information about the touch gesture to the control unit 150. The touch screen module 163, according to an embodiment of the present disclosure, may be formed of a hardware controller.

Various types of sensor may be disposed inside or near the touch screen, in order to detect a touch or a proximity of touch on the touch screen. An example of a sensor for detecting a touch on the touch screen may be a tactile sensor. The tactile sensor is a sensor for detecting a contact of a specific object to such a degree that humans may feel it, or to a higher degree. The tactile sensor may detect various types of information such as information about a roughness of a contact surface, a hardness of a contact object, or a temperature at a contact point.

Additionally, an example of a sensor for detecting a touch on the touch screen is a proximity sensor.

The proximity sensor is a sensor for detecting an object which is approaching within a threshold distance of a detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Touch gestures of a user may include a tap, a touch and hold, a double-tap, a drag, panning, a flick, a drag-and-drop, and a swipe.

A "tap" is a gesture in which a user touches a screen by using a finger or a touch tool, for example, an electronic pen, and then immediately lifts the finger or touch tool off from the screen without dragging on the screen.

A "touch and hold" is a gesture in which a user touches a screen by using a finger or a touch tool, and holds the touch for more than a threshold period of time, for example, 2 seconds. That is, a difference in time between time points of a touch on and a lift-off from the screen is longer than the threshold period of time. If the touch input is held for more than the threshold period of time to make a user recognize whether the touch input is a tap or a touch and hold, a feedback signal may be visually, audibly, or tactually provided. The threshold period of time may vary according to various embodiments.

A "double tap" is a gesture in which a user touches a screen and lifts the touch twice within a threshold time period.

A "drag" is a gesture in which a user touches a screen and moves the touching object to another location on the screen while maintaining contact with the screen. When the drag is performed, an object may move, or a panning gesture, which is described below, may be performed.

A "panning" gesture is a gesture in which a user performs a drag without selecting an object. As the panning does not select a specific object, an object does not move in a page, and the page moves in the screen or a group of objects moves in the page.

A "flick" is a gesture in which a user performs a drag at a threshold speed or higher, for example, 100 pixels/second. The flick may be distinguished from the drag or the panning based on whether a moving speed of the touching object is equal to or higher than the threshold speed.

A "drag and drop" is a gesture in which a user drags an object to a predetermined place in a screen by using a finger or a touch tool, and then lifts the finger or touch tool off the screen.

A "pinch" is a multi-touch gesture in which a user touches a screen with at least two fingers and moves the fingers in different directions. The pinch may be a pinch-open gesture for zooming-in to an object or a page, or a pinch-close gesture for zooming-out from an object or a page. A zoom-in or zoom-out value is determined according to a distance between the fingers.

A "swipe" is a gesture for touching an object in a screen by using a finger or a touch tool and moving the finger or the touch tool in a horizontal or vertical direction for a certain distance. Moving in a diagonal direction may not be recognized as a swipe event in certain embodiments.

The memory 160 may include a voice recognition module (not illustrated) for recognizing a voice of a user by using a voice recognition engine and transmitting the recognized voice signal to the control unit 150.

The alarm module 164 may generate a signal for notifying of an event in the mobile terminal 100. Examples of the event in the mobile terminal 100 may include call signal reception, message reception, key signal input, and schedule notification. The alarm module 164 may output an alarm signal in a form of a video signal via the display unit 121 or in a form of an audio signal via the audio output unit 122. The alarm module 164 may also output an alarm signal in a form of a vibration signal via the vibration motor 123.

The alarm module 164 may provide a snooze function. For example, if a user sets the number of alarm repetition to be, for example, 5 times, or an alarm interval to be, for example, 3 minutes, the alarm module 164 may output an alarm signal a predetermined number of times, for example, 5 times, or at a predetermined interval, for example, every 3 minutes.

Applications stored in the memory 160 may vary. For example, an Application Database (DB) 165 may include a reminder application, a contact application, a map application, a music or sound file player application, an e-book application, a healthcare application, a fitness application, or a baby care application, but is not limited thereto.

Figure 3:
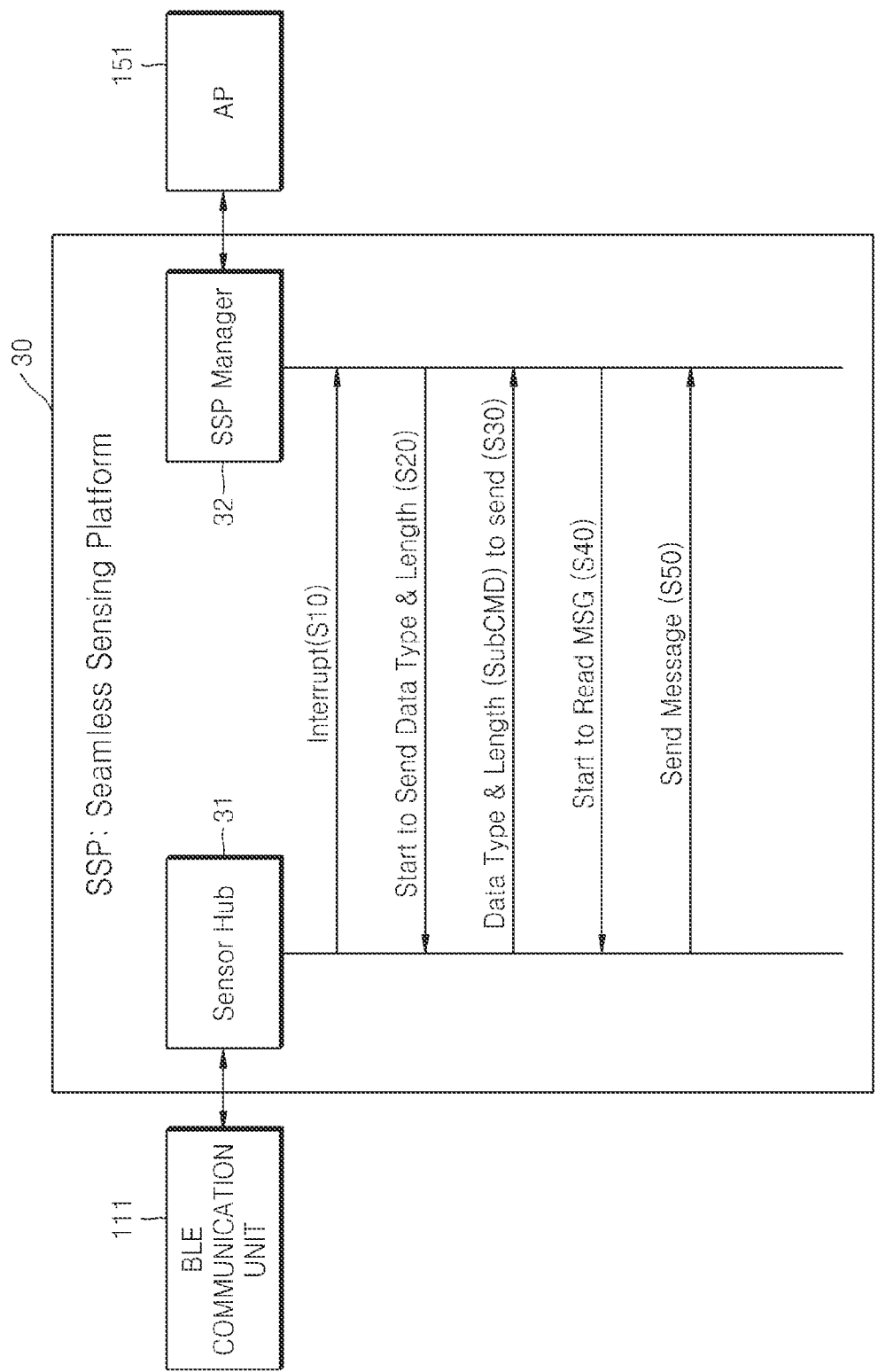
FIG. 3 is a diagram illustrating a data communication protocol of a Seamless Sensing Platform (SSP) according to an embodiment of the present disclosure.

FIG. 3 is a diagram illustrating a data communication protocol of the SSP 30 according to an embodiment of the present disclosure.

Referring to FIG. 3, the SSP 30 may include a sensor hub 31 and an SSP manager 32. The BLE communication unit 111 may be attached to the sensor hub 31, and the SSP manager 32 may be included in a framework of the AP 151.

Therefore, the sensor hub 31 may receive identification information about the BLE device 200 such as a tag ID and a device name, which is broadcast from the external BLE device 200 via the BLE communication unit 111, and also receive a measurement value sensed at the BLE device 200. If it is necessary to wake up the AP 151 from a sleep mode, for example, if it is necessary to execute a predetermined application with regard to the received identification information of the BLE device 200, the sensor hub 31 may send an interrupt signal in operation S10, in order to notify that there is data to be transmitted to the SSP manager 32.

In operation S20, the SSP manager 32 may send, to the sensor hub 31, a signal for requesting a data type and a length which are to be sent by the sensor hub 31. In this case, in operation S30, the sensor hub 31 may send details on the data type and the length to the SSP manager 32. In operation S40, the SSP manager 32 may send a start-to-read Message (MSG) to the sensor hub 31. When the start-to-read MSG is received, the sensor hub 31 may process BLE signal strength data into a predetermined packet and send the processed BLE signal strength data to the SSP manager 32 in operation S50.

FIGS. 4A and 4B are block diagrams illustrating the BLE device 200 according to an embodiment of the present disclosure.

Referring to FIG. 4A, the BLE device 200, according to an embodiment of the present disclosure, may include a power supply unit 210, a BLE communication unit 220, and a control unit 230. However, the illustrated units are not always required elements of the present disclosure. The BLE device 200 may be implemented by using more or fewer units than those shown in FIG. 4A.

The power supply unit 210 supplies power to the BLE device 200. For example, the power supply unit 210 may be a battery. The power supply unit 210 may be recharged or replaced.

The control unit 220 may broadcast the identification information of the BLE device 200 to the outside for a predetermined period of time, e.g., for one second. Then, the control unit 220 may transmit the identification information of the BLE device 200, stored in a memory, to the mobile terminal 100 via the BLE communication unit 230. The identification information of the BLE device 200 is unique information for distinguishing the BLE device 200 from other devices. For example, the identification information may be a tag ID, a device name, a serial number, or a Media Access Control (MAC) address.

Meanwhile, according to an embodiment of the present disclosure, the control unit 220 may broadcast the identification information of the BLE device 200 in an advertising data packet to the outside. In this regard, the control unit 220 according to an embodiment of the present disclosure may include the identification information of the BLE device 200 in a UUID field of the advertising data packet or in an MSD field thereof and may broadcast the identification information to the outside.

Referring to FIG. 4B, the BLE device 200, according to an embodiment of the present disclosure, may further include a sensing unit 240.

The sensing unit 240 may sense a status of the BLE device 200 or a status of an object to which the BLE device 200 is attached, and transmit the sensing information to the control unit 220.

The sensing unit 240 may include at least one from among a temperature sensor, a humidity sensor, a weight sensor, an acceleration sensor, a tilt sensor, a gyro sensor, a 3-axis magnetic sensor, a pressure sensor, a luminance sensor, and a proximity sensor. Additionally, it will be understood by those of ordinary skill in the art that the sensing unit 240 may include various other sensors in addition to those described above.

If the BLE device 200 further includes the sensing unit 240, the control unit 220 may broadcast the sensing information via the BLE communication unit 230 for a predetermined period of time, for example, one second. The predetermined period of time may be changed.

According to an embodiment of the present disclosure, the BLE device 200 may include the sensing information measured by the sensor in the MSD field of the advertising data packet and may broadcast the sensing information. For example, in a case where the BLE device 200 includes the temperature sensor and a current temperature measured by the temperature sensor is 36° C., the BLE device 200 may include a code (for example, "0X06000024") indicating that the temperature is 36° C. in the MSD <Sensor> field and may broadcast the code.

Hereinafter, by referring to FIG. 5, a method in which the mobile terminal 100 provides a predetermined service based on information which is received from the BLE device 200, will be briefly described.

Figure 5:
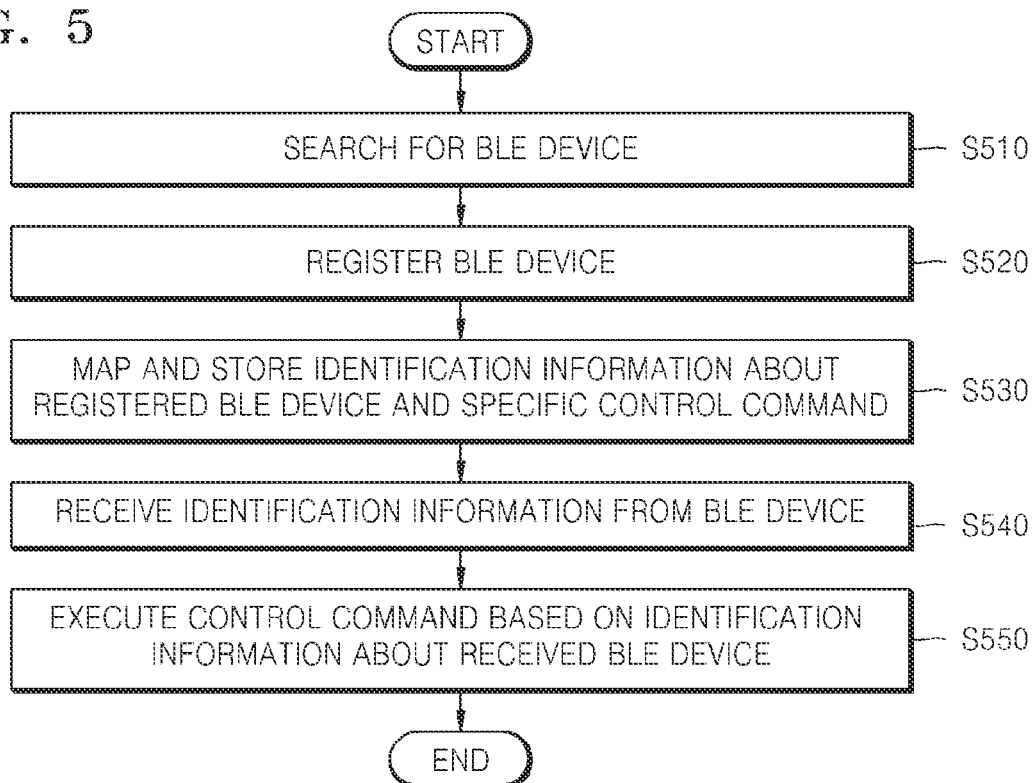
FIG. 5 is a flowchart illustrating a method in which a mobile terminal provides a service by using a BLE device, according to an embodiment of the present disclosure.

FIG. 5 is a flowchart illustrating the method in which the mobile terminal 100 provides a service by using the BLE device 200, according to an embodiment of the present disclosure.

In operation S510, a mobile terminal 100 may search for a nearby BLE device 200. In operation S520, the mobile terminal 100 may register the searched for BLE device 200. For example, the mobile terminal 100 may search for a new BLE device 200 which is not already registered in the mobile terminal 100, and register information about the searched for BLE device 200 in a memory 160. In this case, the mobile terminal 100 may map and register the searched for BLE device 200 and user added information which is input from a user. This will be described in detail by referring to FIG. 6.

In operation S530, the mobile terminal 100 may map and store identification information of the registered BLE device and a control command in a memory 160. The mobile terminal 100 may map and store the identification information of the registered BLE device and the control command, based on a user input.

For example, if an item in a user's work agenda, e.g., "attend office meeting," is mapped with identification information of a first BLE device, e.g., an ID 'XXX', the mobile terminal 100 may map and store the identification information of the first BLE device, i.e., the ID 'XXX', and a notification command or a reminder application execution command regarding the user's scheduled work agenda.

Additionally, if a user maps and inputs specific music and identification information of a second BLE device, e.g., an ID 'YYY', the mobile terminal 100 may map and store the identification information of the second BLE device, i.e., the ID 'YYY', and a playback command regarding the specific music or a music application execution command.

The mobile terminal 100 may map and store the identification information of the BLE device 200 and mode change information. For example, the mobile terminal 100 may map and store identification information of a third BLE device, e.g., an ID 'AAA', with a Wi-Fi mode. Then, the mobile terminal 100 may map and store the identification information of the third BLE device, i.e., the ID 'AAA', with a Bluetooth mode.

In operation S540, if the mobile terminal 100 is located within a communication range of the BLE device 200, the mobile terminal 100 may receive identification information from the BLE device 200. According to an embodiment of the present disclosure, the mobile terminal 100 may receive sensing information from the BLE device 200.

The mobile terminal 100 compares the identification information received from the BLE device 200 to a list of registered BLE devices which is stored in the memory 160, thus determining whether the BLE device 200 which has transmitted the identification information is registered. Also, the mobile terminal 100 may determine whether there is a control command which is mapped with the identification information received from the BLE device 200.

If there is a control command which is mapped with the identification information received from the BLE device 200, in operation S550, the mobile terminal 100 may execute the control command, based on the received identification information of the BLE device.

For example, if identification information, e.g., an ID 'XXX', is received from the first BLE device, the mobile terminal 100 may search for control information stored in the memory 160. In this case, if the identification information of the first BLE device, i.e., the ID 'XXX', is mapped with a command for controlling output of a notification message, e.g., "attend office meeting," the mobile terminal 100 may execute a predetermined application, e.g., a reminder application, to output the notification message, i.e., "attend office meeting."

Additionally, if identification information, e.g., an ID 'AAA', is received from a third BLE device, the mobile terminal 100 may search for control information stored in the memory 160 and find 'Set a WiFi mode' which is a control command mapped with the ID 'AAA'. In this case, the mobile terminal 100 may automatically activate a WiFi module.

The mobile terminal 100 may also execute the control command, based on sensing information received from the BLE device 200. The sensing information received from the BLE device 200 may be data sensed at the BLE device 200 or information which is obtained by post-processing the data sensed at the BLE device 200.

For example, the mobile terminal 100 may receive temperature information regarding the BLE device 200 attached to a baby bottle, which was sensed by a temperature sensor for a predetermined period of time, thus monitoring a temperature of the baby bottle. If, during the monitoring, the temperature of the baby bottle reaches a target temperature which is defined by a user, the mobile terminal 100 may output a notification message such as "The temperature of the baby bottle is appropriately set."

Additionally, if motion information sensed by a motion sensor is received from the BLE device 200, the mobile terminal 100 may execute an application which corresponds to the motion information. For example, if motion information regarding shaking the baby bottle twice is received, the mobile terminal 100 may execute a call application and attempt to make a phone call to a device of another person, e.g., a parent, which is predefined with regard to a motion of shaking the baby bottle twice.

That is, the mobile terminal 100, according to an embodiment of the present disclosure, may provide various services, such as a reminder service, a mode change service, a monitoring service, or a remote control service, by using a BLE device 200 located in a near field range. This will be described in detail later.

Figure 6:
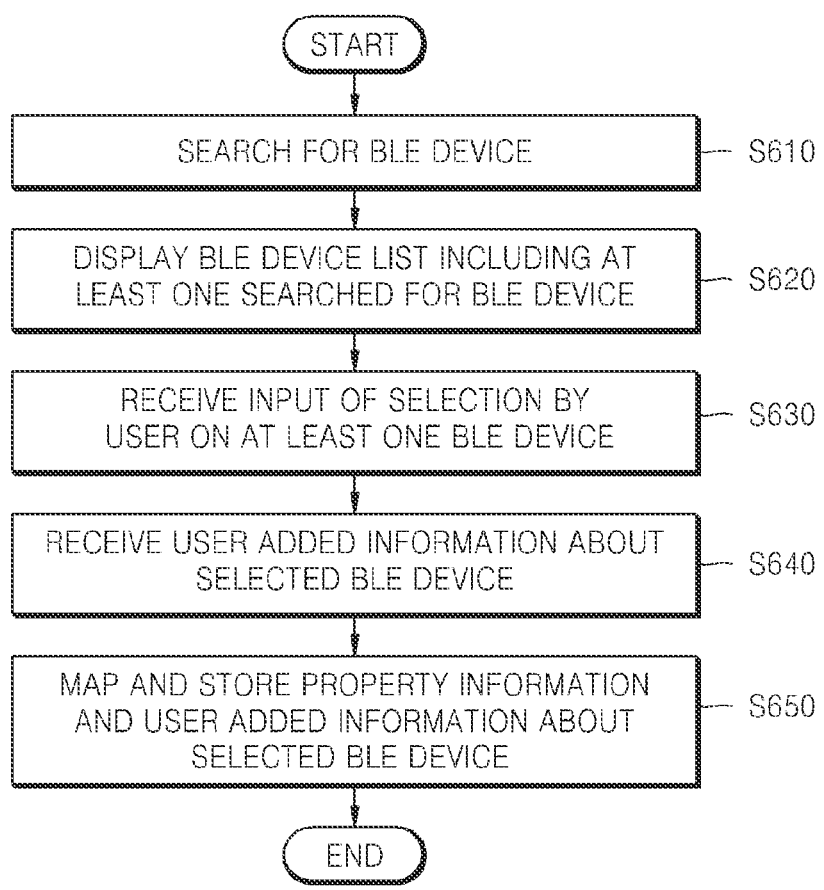
FIG. 6 is a flowchart illustrating a method in which the mobile terminal registers and controls at least one BLE device, according to an embodiment of the present disclosure.

FIG. 6 is a flowchart illustrating a method in which the mobile terminal 100 registers and controls the BLE device 200 according to an embodiment of the present disclosure.

Referring to FIG. 6, the method of registering and managing the BLE device 200, according to an embodiment of the present disclosure, includes the method of using the mobile terminal 100 shown in FIGS. 1, 2, and 3. Therefore, even if omitted below, the description given above with respect to the mobile terminal 100 shown in FIGS. 1, 2, and 3 may also be applied to the method shown in FIG. 6.

In operation S610, the mobile terminal 100 may search for the BLE device 200. For example, a request for registering or adding a new BLE device 200 is received from a user, the mobile terminal 100 may receive identification information in a format of an advertising packet from a nearby BLE device 200. According to an embodiment of the present disclosure, the mobile terminal 100 may also receive identification information in a form of an advertising packet from the nearby BLE device 200, independently from a user input.

That is, the BLE device 200 according to an embodiment of the present disclosure may include the identification information of the BLE device 200 in a UUID field of an advertising packet or in an MSD field thereof and may broadcast the identification information.

The identification information, according to an embodiment of the present disclosure, may include property information regarding the BLE device 200. The property information is information about a property of the corresponding BLE device, such as its appearance. For example, the property information may be color information such as red, yellow, blue, orange, purple, or black, shape information such as a rectangle, a triangle, a circle, a star, or a heart, and image information such as a water drop, a diamond, a clover, a bear, or a sunflower. Additionally, the property information, according to an embodiment of the present disclosure, may include sensor information, regarding a sensor included in the BLE device 200, such as a sensor ID, a type of the sensor, and a name of the sensor.

The mobile terminal 100 may receive the property information from the BLE device 200, separately from the identification information. That is, the BLE device 200 according to an embodiment of the present disclosure may include the property information in the MSD field of the advertising data packet and may broadcast the property information to the outside, separately from the identification information.

In operation S620, the mobile terminal 100 may display a list of the BLE devices which include the property information regarding a searched for BLE device.

The mobile terminal 100 may determine whether the searched for BLE device is a registered BLE device, based on the identification information of the searched for BLE device. Also, the mobile terminal 100 may create a list of unregistered BLE devices, by using identification information of at least one unregistered BLE device from among the searched for BLE devices. In the list of the BLE devices according to an embodiment of the present disclosure, the property information regarding the BLE devices, such as color information, shape information, image information, and sensor information, may be displayed. Therefore, a user may distinguish several BLE devices from each other easily.

In operation S630, the mobile terminal 100 may receive a selection made by a user regarding at least one BLE device from the list of the BLE devices. For example, the user may select at least one BLE device to be registered from the list of the searched for BLE devices. The user may tap, swipe, or flick a certain area in a touch screen which displays a BLE device to be selected, in order to select at least one BLE device from the list of the BLE devices.

In operation S640, the mobile terminal 100 may receive user added information from a user regarding the selected BLE device. The mobile terminal 100, according to an embodiment of the present disclosure, may provide a GUI which may receive the user added information regarding the BLE device selected by the user. The user may input the user added information via the GUI.

The user added information may mean arbitrary information or detailed information, about the BLE device 200, which is input by the user. Furthermore, the user added information may include information obtained by adding information provided to the mobile terminal 100 by the searched for BLE device 200 to information provided by the user via the GUI.

For example, the user added information may include an ID arbitrarily set by the user, a nickname, a category, a memo, notification information, an image of an object which corresponds to the BLE device 200, for example, an object to which the BLE device is attached or a place in which the BLE device is located, but is not limited thereto.

In operation S650, the mobile terminal 100 may register a selected BLE device 200. That is, the mobile terminal 100 may map and store the property information regarding the BLE device 200, e.g., color information, shape information, image information and sensor information and the user added information in the memory 160. Thus, the mobile terminal 100 may register the selected BLE device 200.

The mobile terminal 100 may store the property information regarding the selected BLE device 200 and the user added information as profile information regarding the BLE device 200. Accordingly, the user may easily manage the BLE device 200 by identifying the profile information regarding the registered BLE device 200. If a sensor is included in the BLE device 200, a value measured by the sensor may be automatically reflected in the profile information.

Figure 7:
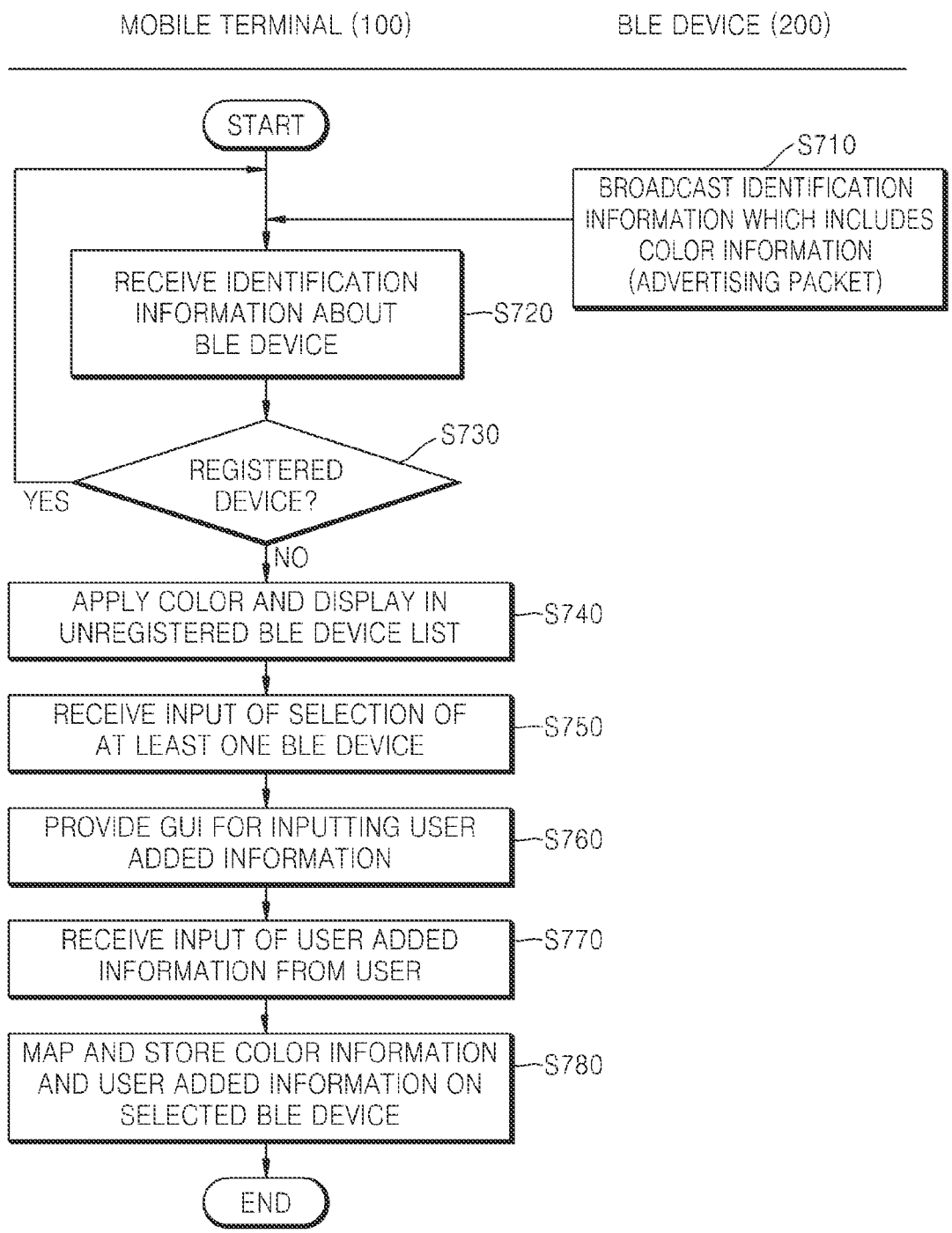
FIG. 7 is a flowchart illustrating a method of applying color information of a BLE device to a list of BLE devices, according to an embodiment of the present disclosure.

FIG. 7 is a flowchart illustrating a method of applying the color information of the BLE device 200 to a list according to an embodiment of the present disclosure.

In operation S710, the BLE device 200 may broadcast identification information, which may include, for example, appearance color information, via BLE communication. For example, in a case where the BLE device 200 is a BLE tag having a blue color, the BLE device 200 may include identification information (for example, "SAMSUNG_TAG001_blue") including color information in a UUID field of an advertising data packet or in an MSD field thereof and may broadcast the identification information to the outside.

In operation S720, the mobile terminal 100 may receive identification information which includes the color information from the nearby BLE device 200.

In operation S730, the mobile terminal 100 may compare the identification information of the received BLE device 200 to a list of registered BLE devices, which is stored in the memory 160, in order to determine whether the searched for BLE device 200 is the registered device.

In operation S740, if the searched for BLE device is an unregistered BLE device, the mobile terminal 100 may display identification information of the searched for device in the list of unregistered BLE devices by applying colors to the list of unregistered BLE devices. For example, if a searched for BLE device is yellow, the mobile terminal 100 may add identification information of the searched for BLE device in the list of the unregistered BLE devices by applying yellow to the identification information of the searched for BLE device.

Operations S750 through S780 correspond to the operations S630 through S650 of FIG. 6. Therefore, a detailed description thereof will not be repeated here. The detailed description will be provided by referring to FIGS. 8A, 8B, 8C, 9A, and 9B.

Figure 8A:
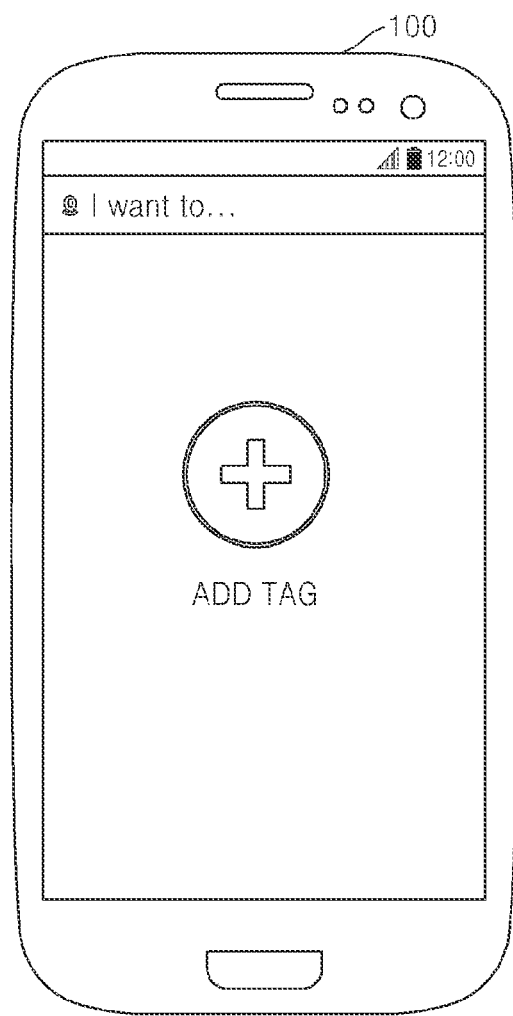
FIGS. 8A, 8B, and 8C are diagrams illustrating the list of BLE devices including the color information, according to an embodiment of the present disclosure.
Figure 8B:
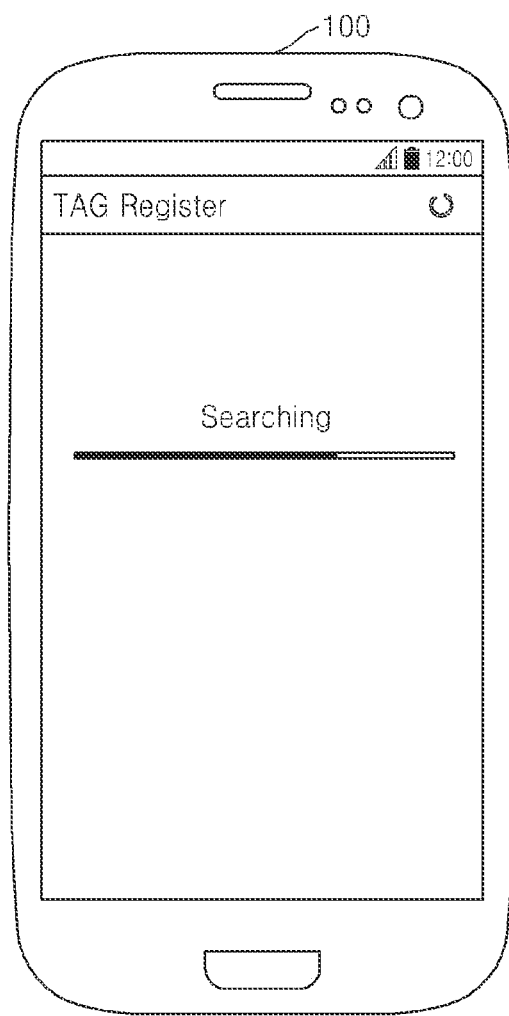
Figure 8C:
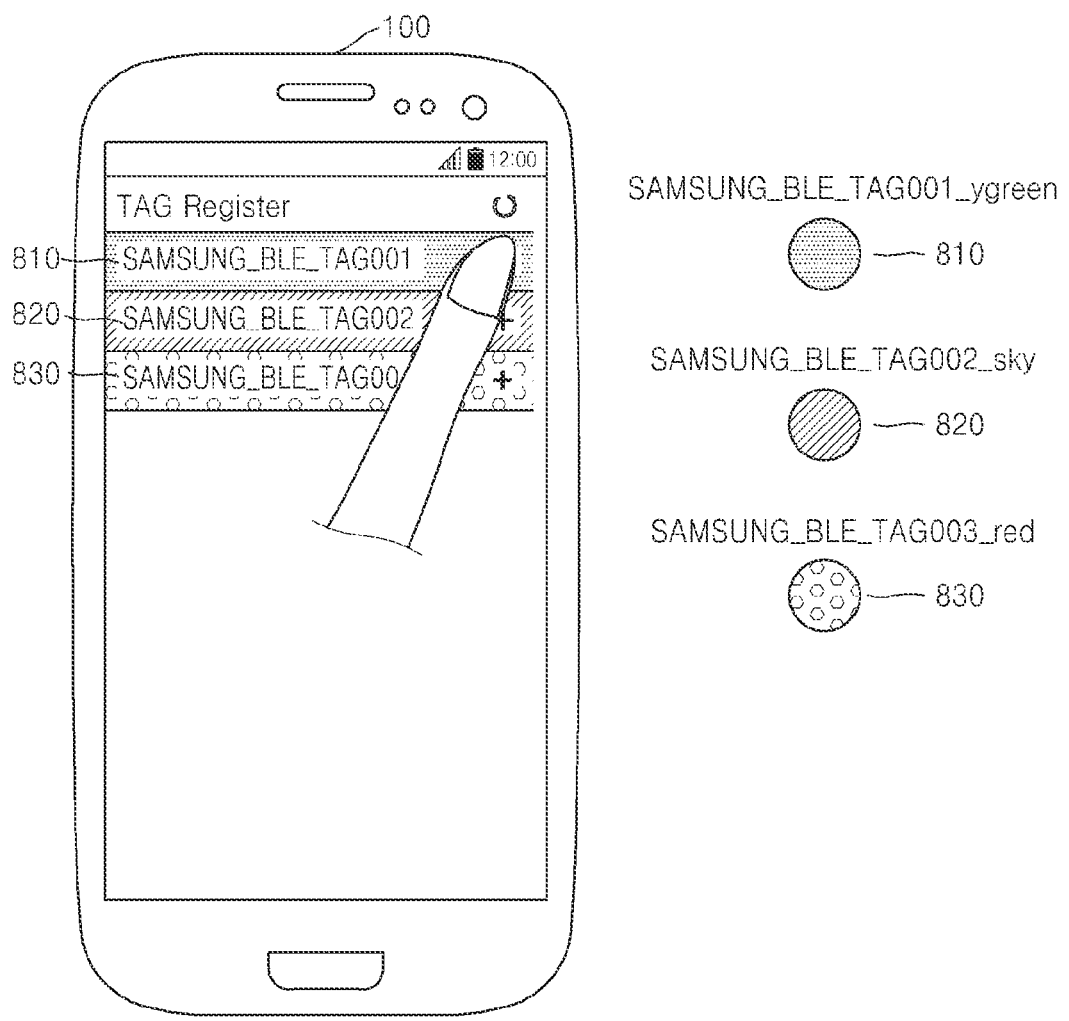

FIGS. 8A, 8B, and 8C are diagrams illustrating a list of BLE devices which include the color information according to an embodiment of the present disclosure.

If a user selects a BLE add tag menu as illustrated in FIG. 8A, the mobile terminal 100 may search for a nearby BLE tag as illustrated in FIG. 8B. In this case, as illustrated in FIG. 8C, the mobile terminal 100 may receive first identification information, 'SAMSUNG_BLE_TAG001_ygreen', from a first BLE tag 810, second information, 'SAMSUNG_BLE_TAG002_sky', from a second BLE tag 820, and third information, 'SAMSUNG_BLE_TAG003_red', from a third BLE tag 830.

The first, second, and third identification information respectively include a color value of the BLE tag, such as yellow-green, sky blue, and red. Accordingly, the mobile terminal 100 may display the list of the searched for BLE devices by applying the colors yellow-green to the first identification information, sky-blue to the second identification, and red to the third identification information. Therefore, the user may distinguish the identification information between nearby several BLE devices.

According to an embodiment of the present disclosure, if the identification information received from the BLE tag includes a shape value, the mobile terminal 100 may display the list of the BLE devices by applying a shape to the list of the BLE devices.

Referring to FIG. 8C, if the user selects a specific BLE device 810 from the list of the BLE devices, the mobile terminal 100 may provide an input window for receiving an input of user added information regarding the selected BLE device 810. This will be described by referring to FIGS. 9A and 9B.

Figure 9A:
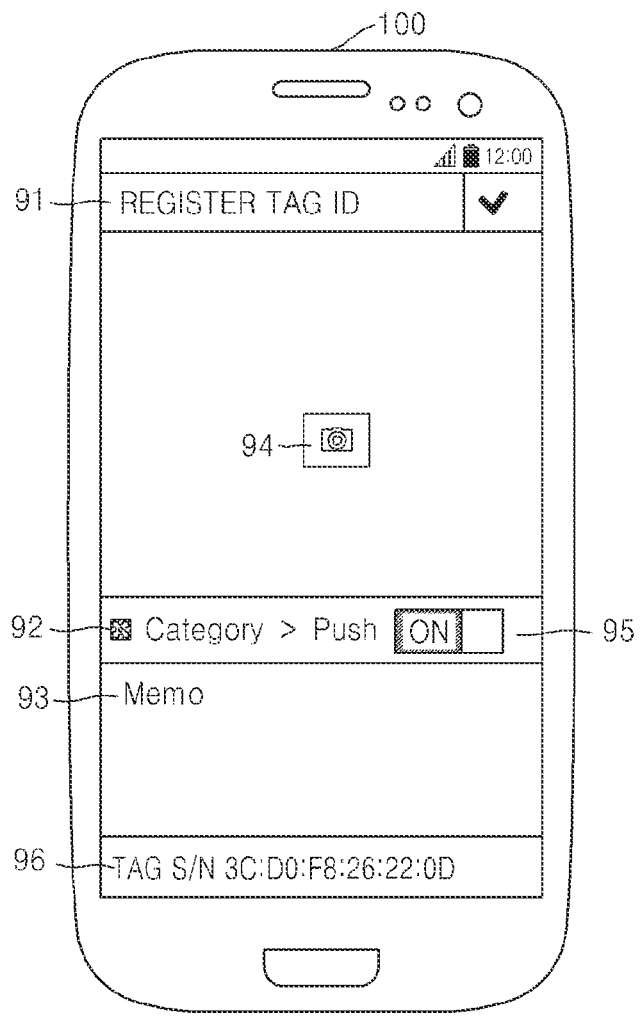
FIGS. 9A and 9B are diagrams illustrating an input window for receiving an input of user added information, according to an embodiment of the present disclosure.
Figure 9B:
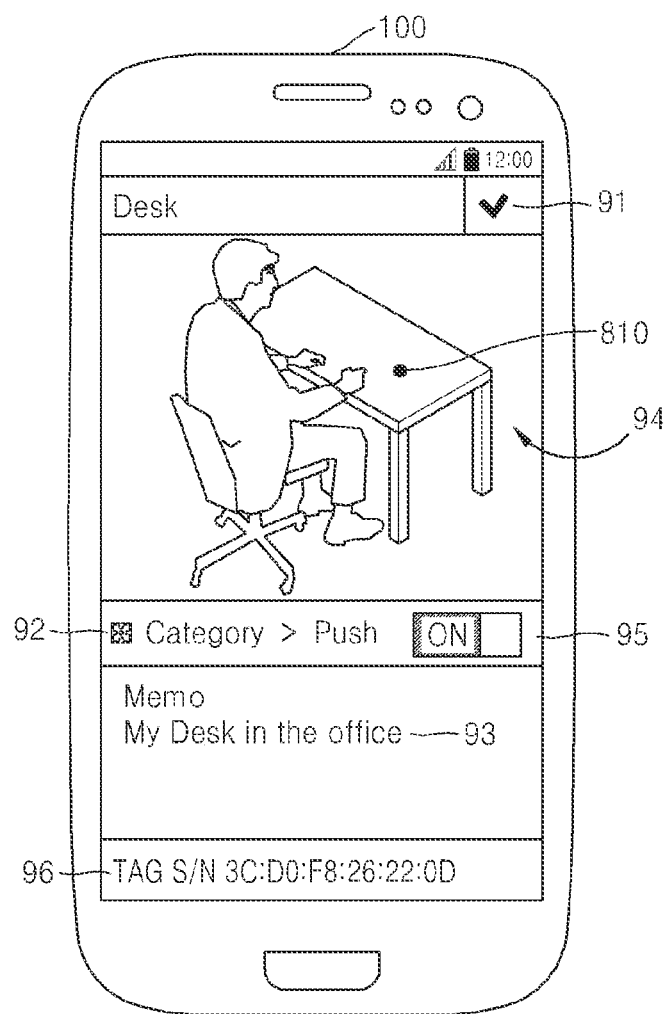

FIGS. 9A and 9B are diagrams illustrating an input window for receiving an input of user added information according to an embodiment of the present disclosure.

Referring to FIG. 9A, the mobile terminal 100 may provide the input window for receiving an input of user added information regarding the selected BLE device 810. The input window may include an ID input field 91, a category input field 92, a memo field 93, an image insertion field 94, and a notification selection field 95. The ID input field 91 is a field in which a user may input an arbitrary ID for convenience of use. The ID input field 91 may be distinguished from a field 96 for displaying unique identification information of the BLE device 810, for example, TAG S/N 3C:D0:F8:26:22:0D.

Referring to FIG. 9B, if the user selects and registers a BLE device 900 to be attached to an office desk, the user may set an ID 91 of the selected BLE device 900 as 'Desk' and take a simple memo 93, e.g., "My desk in the office," for easy reminding.

Additionally, the user may insert at least one image 94 from among an image of the desk to which the BLE device 900 is attached and an image of the BLE device 900. Upon a user request, the mobile terminal 100 may read a stored image, or photograph a desk by activating a photographing mode.

The mobile terminal 100, according to an embodiment of the present disclosure, may map and store user added information, which is input by the user during registration of the BLE device, and property information regarding the BLE device 900 as profile information.

Figure 10:
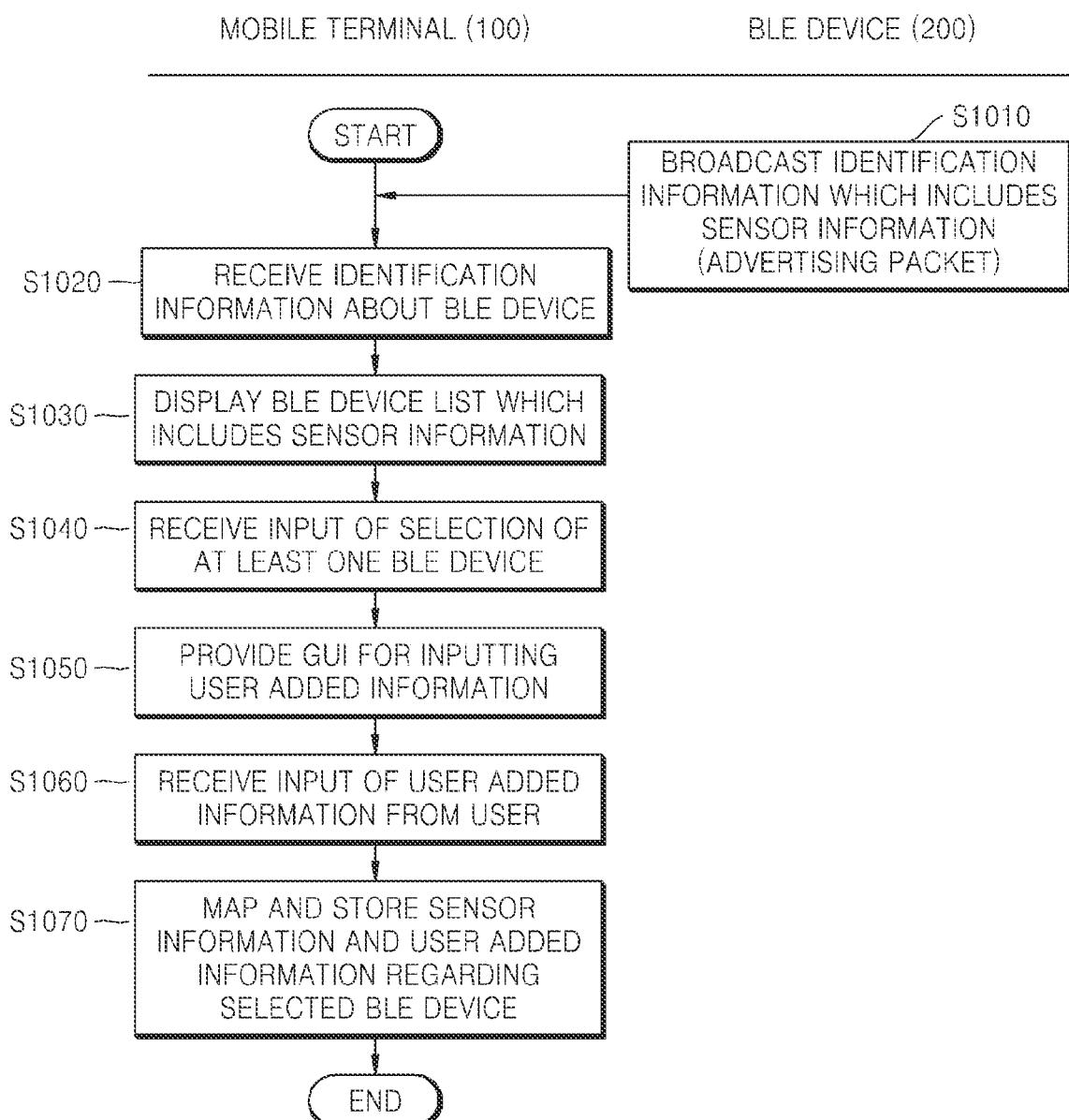
FIG. 10 is a flowchart illustrating a method of displaying the BLE device list including sensor information, according to an embodiment of the present disclosure.

FIG. 10 is a flowchart illustrating a method of displaying the BLE device list which includes sensor information, according to an embodiment of the present disclosure.

In operation S1010, the BLE device 200 may broadcast identification information which includes sensor information. For example, in a case where the BLE device 200 is a BLE tag including a temperature sensor, the BLE device 200 may include identification information (for example, "SAMSUNG_Temp_TAG001_blue") including sensor information in a UUID field of an advertising data packet or in an MSD field thereof, and may broadcast the identification information to the outside.

In operation S1020, the mobile terminal 100 may receive the identification information of the BLE device 200. In operation 51030, the mobile terminal 100 may create and display a list of the BLE devices which include the sensor information.

Operations S1040 through S1070 correspond to the operations S630 through S650 of FIG. 6. Therefore, a detailed description thereof will not be repeated here. This will be described by referring to FIGS. 11A, 11B, 11C, 12, 13A, and 13B.

Figure 11A:
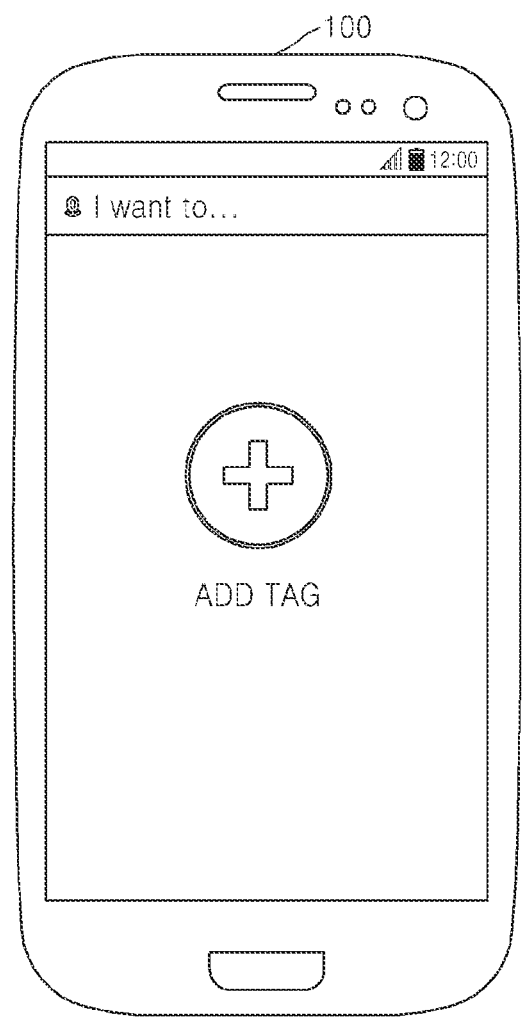
Figure 11B:
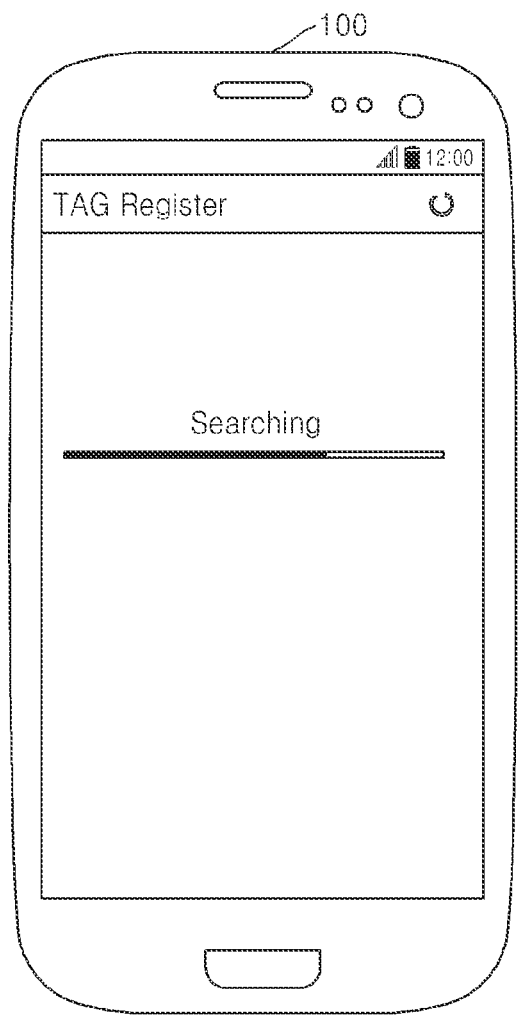

FIGS. 11A, 11B, and 11C are diagrams illustrating the list of the BLE devices which include the sensor information, according to an embodiment of the present disclosure.

If a user selects a BLE add tag menu as illustrated in FIG. 11A, the mobile terminal 100 may search for a nearby BLE tag as illustrated in FIG. 11B. In this case, as illustrated in FIG. 11C, the mobile terminal 100 may receive first identification information, 'SAMSUNG_Temp_TAG001_blue', from a first BLE tag 1110, second information, 'SAMSUNG_Motion_TAG002_sky' from a second BLE tag 1120, and third information, 'SAMSUNG_Weight_TAG003_red', from a third BLE tag 1130.

The first, second, and third identification information respectively may include a color value implemented in the BLE device, for example temp, motion, and weight. Accordingly, the mobile terminal 100 may display the list of the BLE devices which includes sensor information, for example, a temperature sensor, a motion sensor, and a weight sensor. Therefore, the user may easily determine the BLE tag to be registered, by identifying the sensor information of the BLE tag in the list of the BLE devices. For example, if a BLE tag to be used for a baby bottle is necessary, the user may select the first BLE tag 1110 which includes the temperature sensor and register the first BLE tag 1110 in the mobile terminal 100.

Figure 12:
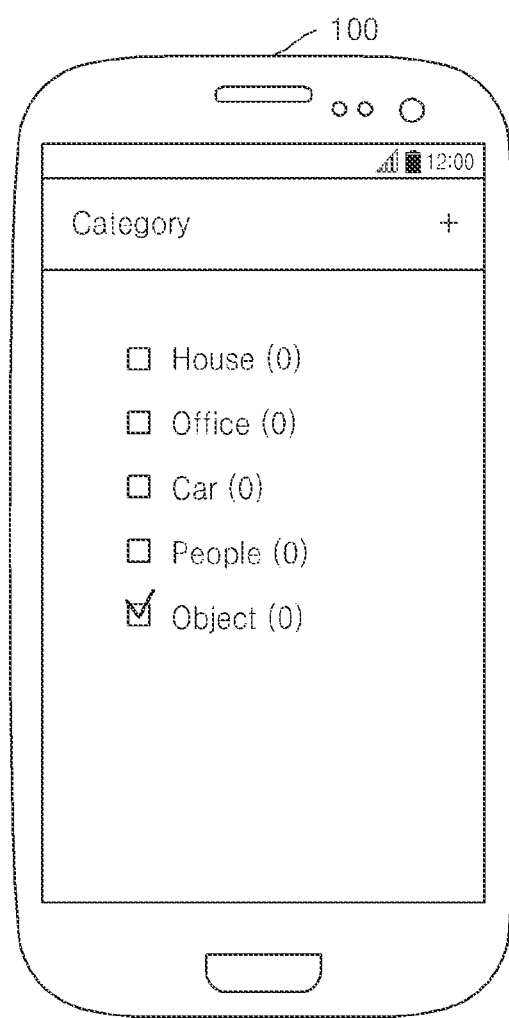
FIG. 12 is a diagram illustrating a configuration window for setting a category, according to an embodiment of the present disclosure.

FIG. 12 is a diagram illustrating a configuration window for setting a category, according to an embodiment of the present disclosure.

When receiving a selection of at least one BLE device 200 from the user, the mobile terminal 100 may display a configuration window for setting a category. The category may be classified according to a location of the BLE device 200 such as a house, an office, and a car, an object which is monitored via the BLE device 200, or people who possess the BLE device 200, but is not limited thereto.

Figure 13A:
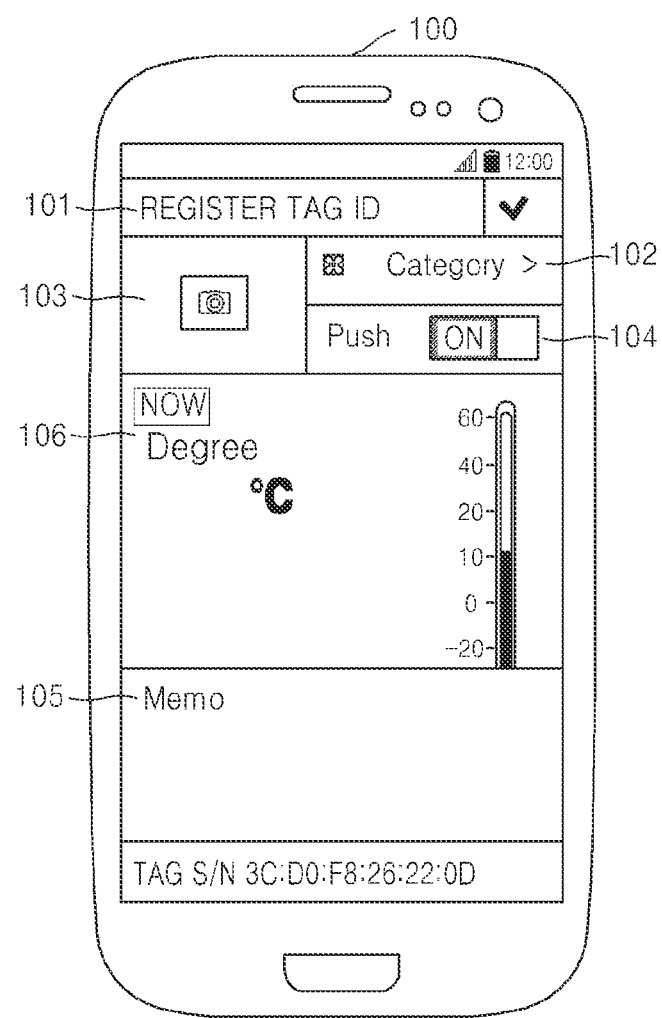
FIGS. 13A and 13B are diagrams illustrating an input window for receiving an input of user added information regarding a BLE device including a sensor, according to an embodiment of the present disclosure.
Figure 13B:
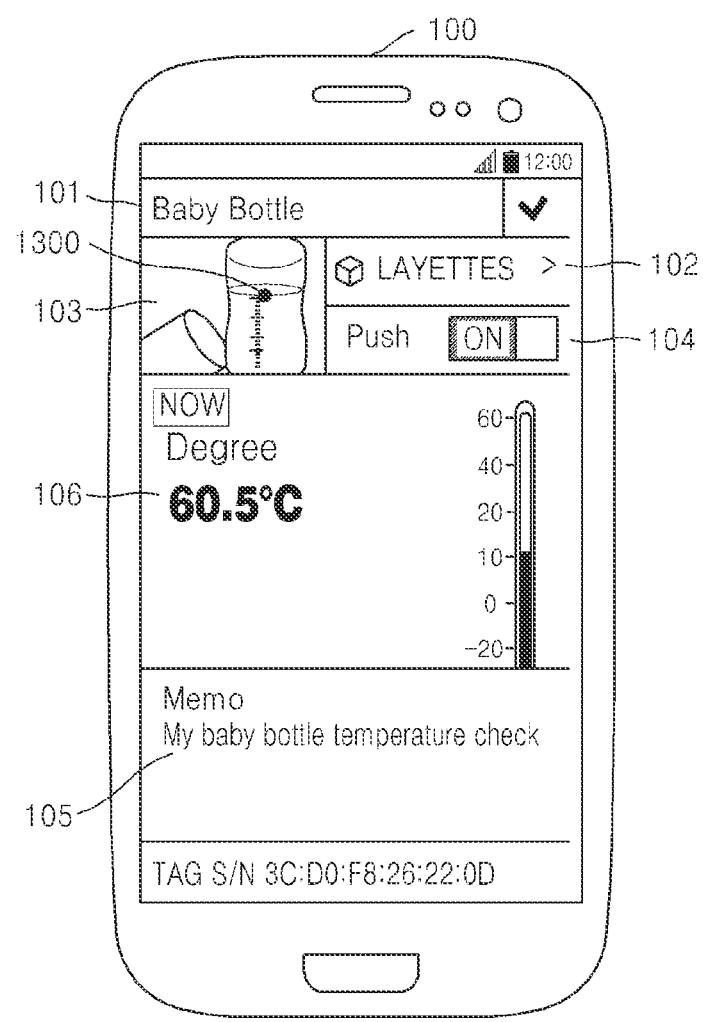

FIGS. 13A and 13B are diagrams illustrating an input window for receiving an input of user added information regarding a BLE device which includes a sensor, according to an embodiment of the present disclosure.

Referring to FIG. 13A, the input window for inputting user added information, according to an embodiment of the present disclosure, may include an ID input field 101, a category input field 102, an image insertion field 103, a notification selection field 104, and a memo field 105.

Referring to FIG. 13B, if the user decides to register a BLE device 1300 which includes a temperature sensor, so as to attach the BLE device 200 to a baby bottle, the user may input 'baby bottle' as an ID 101 of the BLE device 1300, set a category 102 as 'layettes', and take a simple memo 105, for example, "My baby bottle temperature check." Additionally, the user may set the input window to display a notification message when a sensor value, received from the BLE device, reaches a predetermined value.

Sensing information received from the BLE device 200, e.g., a current temperature of 60.5° C., may be automatically reflected and displayed in the sensing information display field 106, independently from a user input.

The mobile terminal 100, according to an embodiment of the present disclosure, may map and register user added information and property information regarding the BLE device 1300, such as sensor information and appearance color information, which are input by the user during registration of the BLE device 1300.

Figure 14:
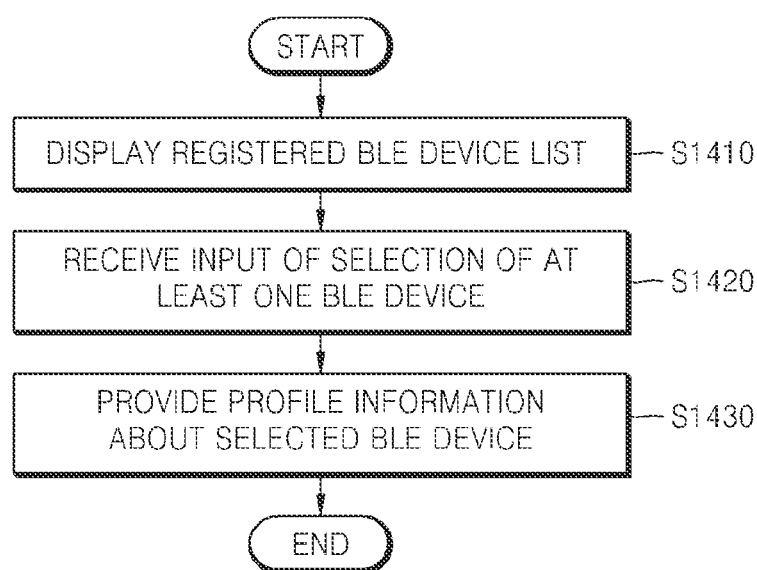
FIG. 14 is a flowchart illustrating a method in which the mobile terminal provides profile information regarding a registered BLE device, according to an embodiment of the present disclosure.
Figure 15:
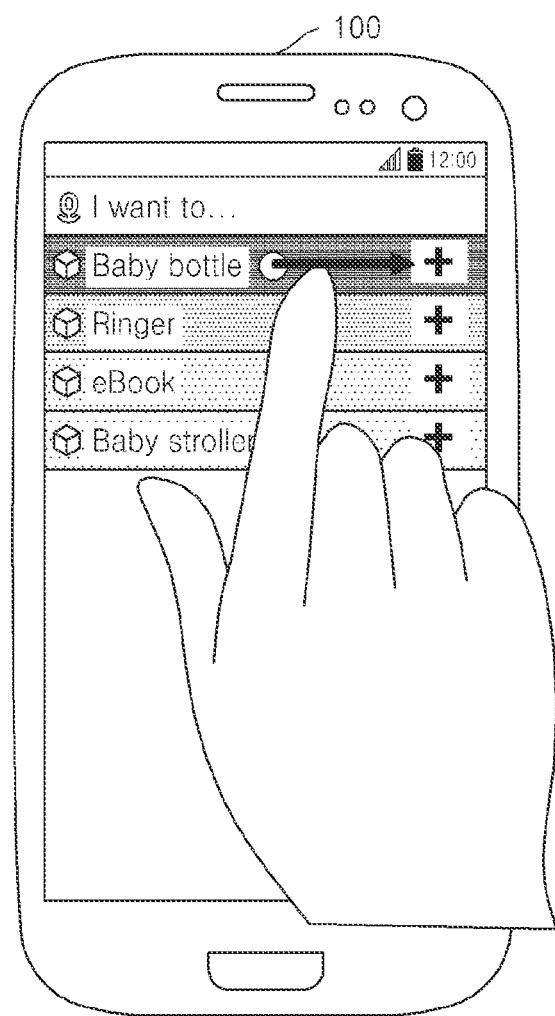
FIG. 15 is a diagram illustrating a list of the registered BLE devices according to an embodiment of the present disclosure.

FIG. 14 is a flowchart illustrating a method of providing profile information regarding a registered BLE device according to an embodiment of the present disclosure. FIG. 15 is a diagram illustrating a list of the registered BLE devices according to an embodiment of the present disclosure.

In operation S1410, the mobile terminal 100 may display a list of BLE devices which are registered in the mobile terminal 100. The mobile terminal 100, according to an embodiment of the present disclosure, may display the list of registered BLE devices, based on respective profile information regarding the registered BLE devices. That is, the mobile terminal 100 may configure the list of registered BLE devices by using identification information which is received from the at least one BLE device. Otherwise, the mobile terminal 100 may configure the list of registered BLE devices by using user added information which is input by the user, for example, an ID.

For example, as illustrated in FIG. 15, if a user input for requesting a list of registered BLE devices is received, the mobile terminal 100 may display the list of registered BLE devices on a screen. The mobile terminal 100 may configure and display a list of registered BLE devices, which may include an ID, a nickname, and category information which are input by the user to easily identify each of the registered BLE devices.

In operation S1420, the mobile terminal 100 may receive a selection made by a user for at least one registered BLE device from the list of registered devices. According to an embodiment of the present disclosure, the user may select at least one registered BLE device by using, for example, a tap gesture, a swipe gesture, a flick gesture, or a voice command.

In operation S1430, the mobile terminal 100 may provide profile information regarding the registered BLE device which is selected by the user. The profile information may include at least one from among unique identification information such as a device ID, a Serial Number (S/N), and a Media Access Control (MAC) address, property information such as appearance color information, image information, and sensor information, and user added information such as an ID, a nickname, a category, and a memo which are set by the user, with regard to the selected registered BLE device.

For example, the mobile terminal 100 may provide an ID, a nickname, a category, a memo, and notification information regarding the registered BLE device as profile information. Additionally, according to an embodiment of the present disclosure, if the registered BLE device includes a sensor, the mobile terminal 100 may receive sensing information detected by the selected registered BLE device from the selected registered BLE device for a predetermined period and display the sensing information as profile information. This will be described by referring to FIGS. 16A, 16B, 16C, 16D, and 16E.

FIGS. 16A, 16B, 16C, 16D, and 16E are diagrams displaying profile information regarding a registered BLE device according to an embodiment of the present disclosure.

Figure 16A:
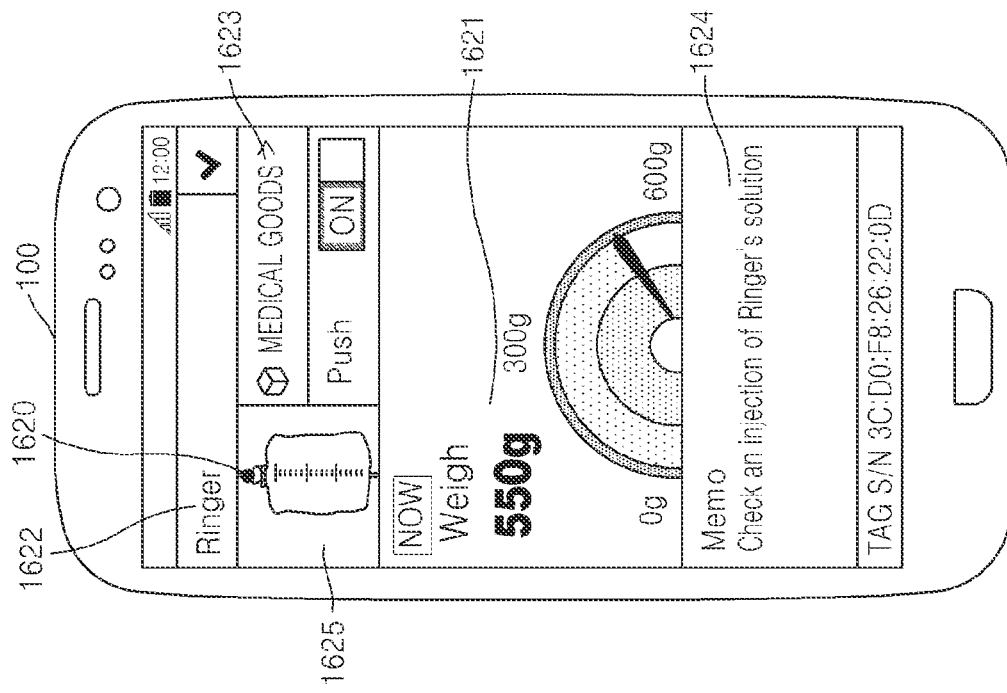
FIGS. 16A, 16B, 16C, 16D, and 16E are diagrams for displaying profile information regarding a registered BLE device, according to an embodiment of the present disclosure.

Referring to FIG. 16A, if a registered BLE device 1610 includes a temperature sensor, the mobile terminal 100 may further display temperature information 1611, e.g., 60.5° C., as the profile information which corresponds to the registered BLE device 1610, in addition to user added information, which are input by the user during registration, such as an ID 1612, e.g., a baby bottle, a category 1613, e.g., layettes, a description of a memo 1614, e.g., "My baby bottle temperature check," and an image 1615, e.g., a photograph of a baby bottle.

Figure 16B:
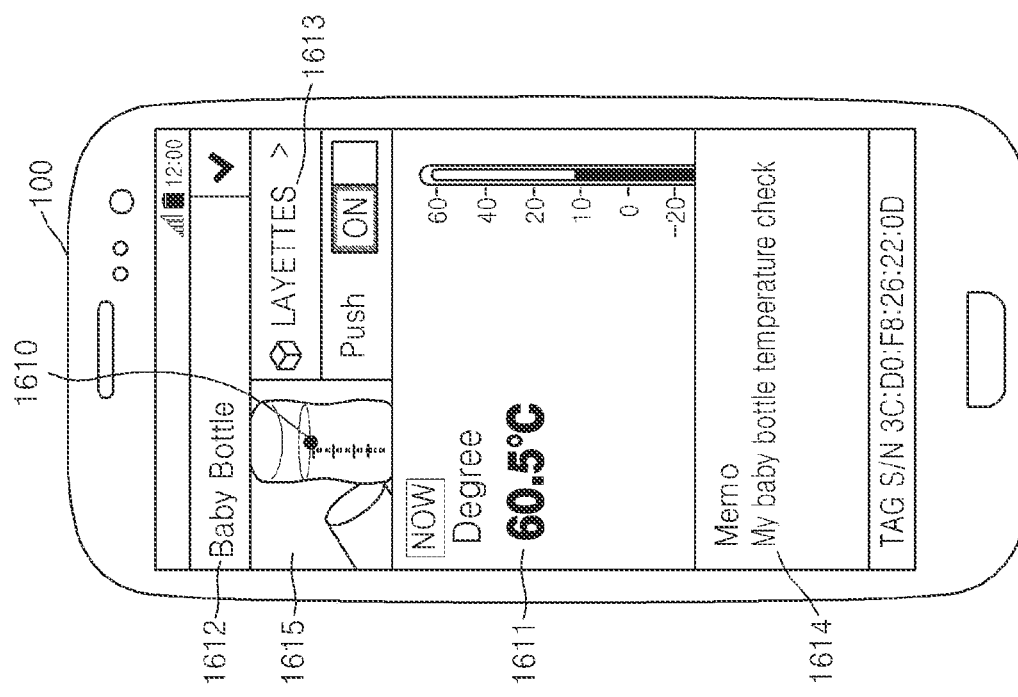

Referring to FIG. 16B, if a registered BLE device 1620 further includes a weight sensor, the mobile terminal 100 may further display weight information 1621, e.g., 550 grams, as the profile information which corresponds to the registered BLE device 1620, in addition to user added information which is input by the user during registration, such as an ID 1622, e.g., Ringer, a category 1623, e.g., medical goods, a description of a memo 1624, e.g., "Check an injection of Ringer's solution," and an image 1625, e.g., a photograph of Ringer's solution.

Figure 16D:
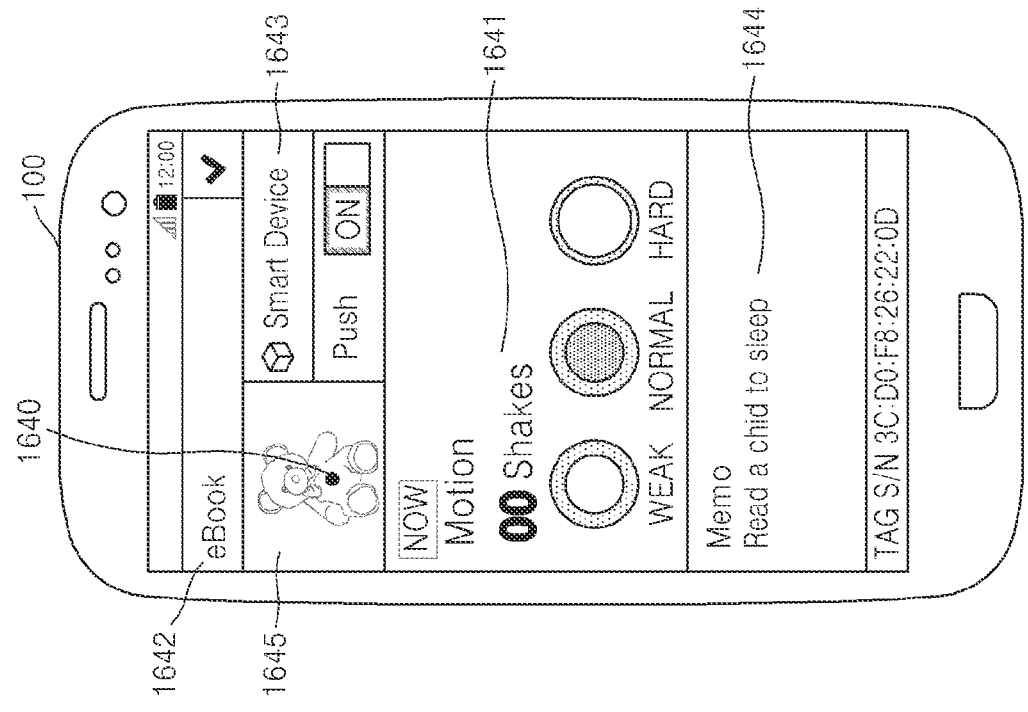
Figure 16C:
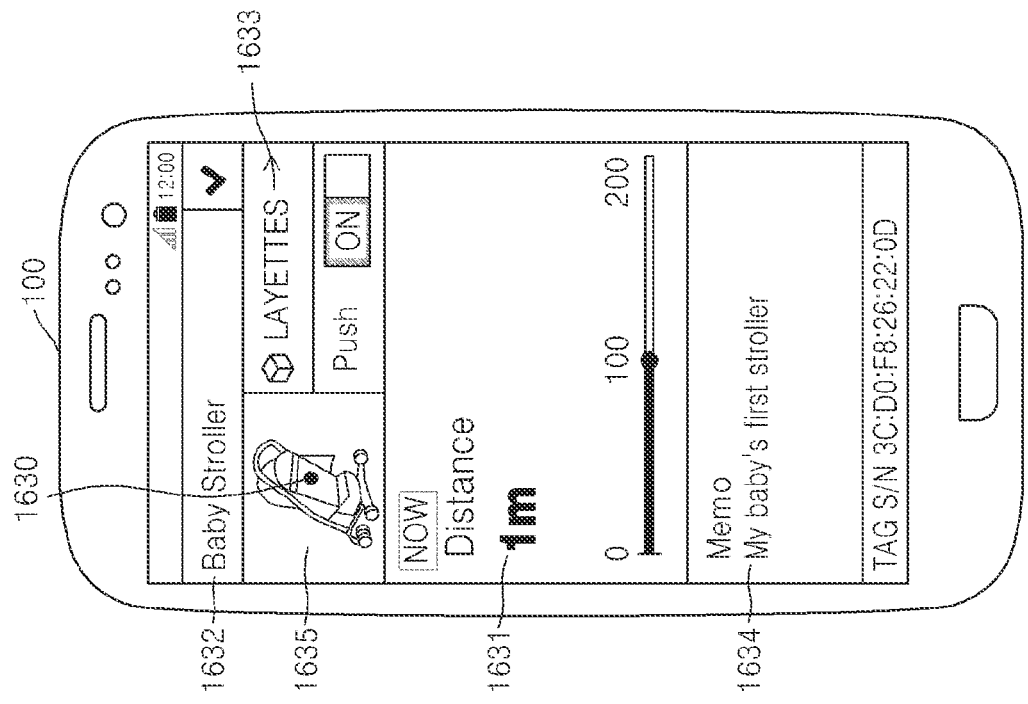

Referring to FIG. 16C, if a registered BLE device 1630 includes a proximity sensor, the mobile terminal 100 may further display information about a sensed distance 1631 between the mobile terminal 100 and the registered BLE device 1630, e.g., 1 meter, as the profile information which corresponds to the registered BLE device 1630, in addition to user added information which is input by the user during registration, such as an ID 1632, e.g., a baby stroller, a category 1633, e.g., layettes, a description of a memo 1634, e.g., "My baby's first stroller," and an image 1635, e.g., an image of a baby stroller.

According to an embodiment of the present disclosure, the mobile terminal 100 may determine information about the distance between the registered BLE device 1630 and the mobile terminal 100, based on the strength of a signal which is received from the registered BLE device 1630. For example, the mobile terminal 100 may determine the distance 1631 between the registered BLE device 1630 and the mobile terminal 100, by using a relationship between the strength of the signal and the distance 1631. That is, when the signal becomes weaker, a distance 1631 between the registered BLE device and the mobile terminal 100 becomes farther. On the contrary, when the signal becomes stronger, the distance 1631 there between becomes nearer. The mobile terminal 100 may display the determined distance information 1631 as profile information regarding the registered BLE device 1630.

Referring to FIG. 16D, if a registered BLE device 1640 includes a motion sensor, the mobile terminal 100 may further display motion information 1641, e.g., 2 Shakes, as the profile information which corresponds to the registered BLE device 1640, in addition to user added information which is input by the user during registration, such as an ID 1642, e.g., eBook, a category 1643, e.g., Smart Device, a description of a memo 1644, e.g., "Read a child to sleep," and an image 1645, e.g., a photograph of a teddy bear.

Figure 16E:
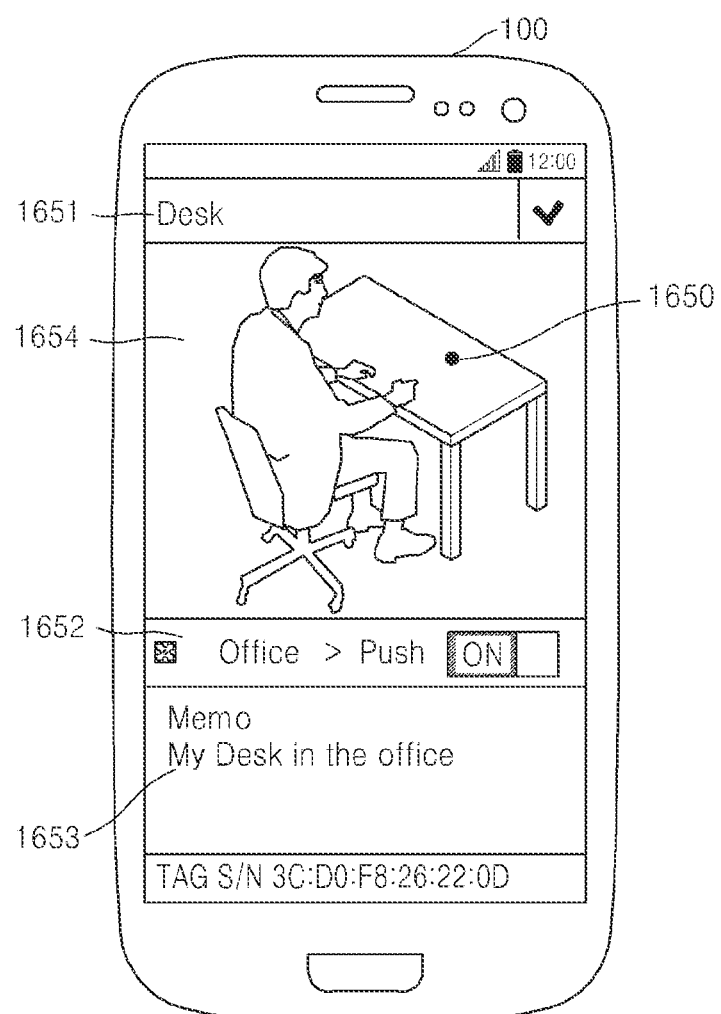

Referring to FIG. 16E, if a registered BLE device 1650 does not include a sensor, the mobile terminal 100 may display an ID 1651, e.g., Desk, a category 1652, e.g., office, a description of a memo 1653, e.g., "My desk in the office," and an image 1654, e.g., a photograph of a desk, which are input by the user during registration, as the profile information which corresponds to the registered BLE device 1650.

According to an embodiment of the present disclosure, the mobile terminal 100 may update user added information input from a user regarding a registered BLE device. For example, if a place where the registered BLE device is attached is changed, the mobile terminal 100 may receive from the user new inputs of an ID, a category, a description of a memo, and an image with regard to the registered BLE device and update the additional user information.

Also, when sensing information is changed, the mobile terminal 100 may update the user added information regarding the registered BLE device. In this regard, sensing information may be included in an MSD field of an advertising packet broadcast from the BLE device 200. A data format of the advertising packet broadcast by the BLE device 200 will now be described in more detail below.

Figure 17:
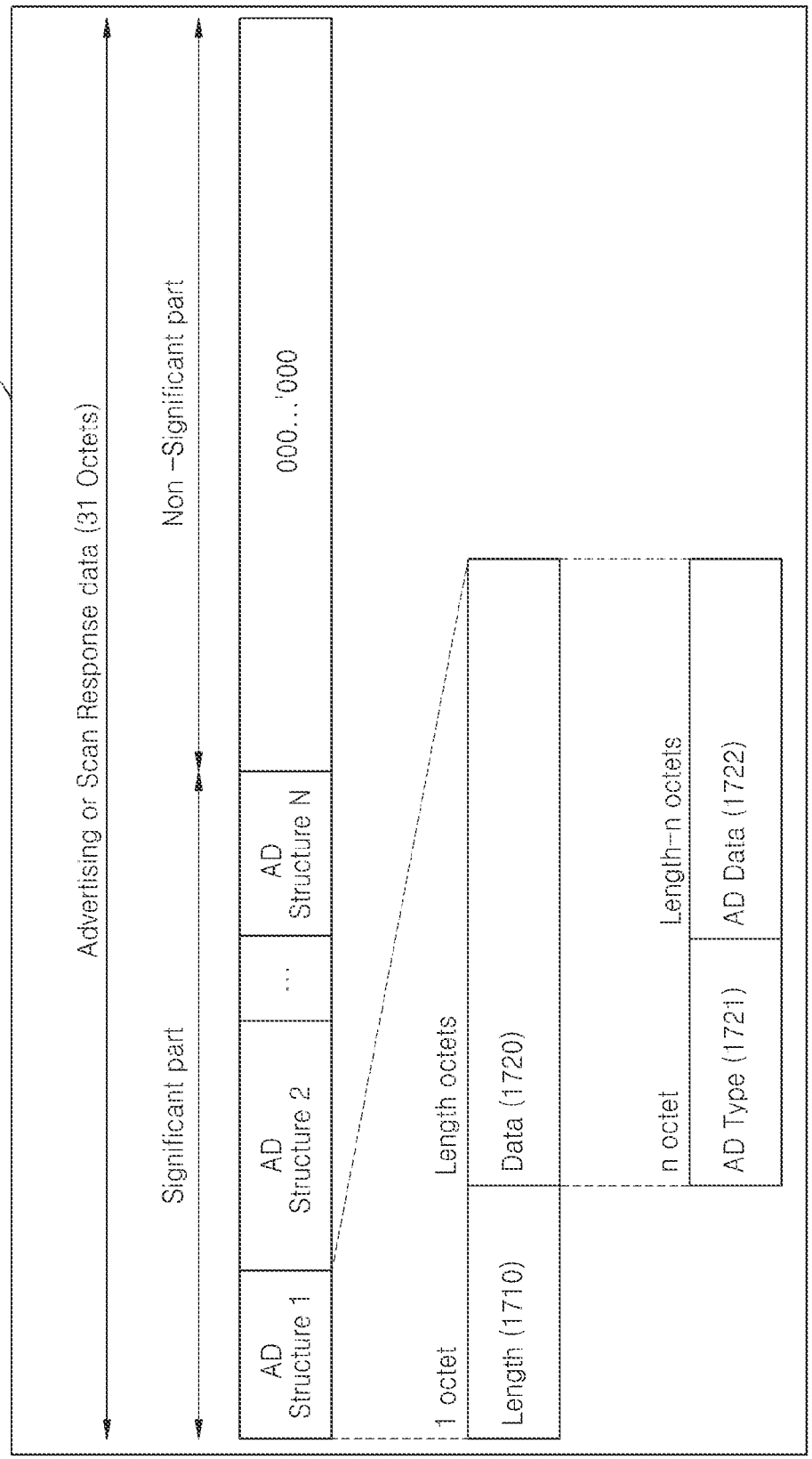
FIG. 17 is a diagram illustrating a data format of an advertising packet broadcast by a BLE device, according to an embodiment of the present disclosure.

FIG. 17 is a diagram illustrating a data format 1700 of an advertising packet broadcast by the BLE device 200, according to an embodiment of the present disclosure.

The data format 1700 of FIG. 17 shows a payload excluding a header of the advertising packet broadcast by the BLE device 200. Advertising Data (AD) included in the payload of the advertising packet according to an embodiment of the present disclosure may be composed, for example, of 31 octets (Bytes).

Meanwhile, a plurality of AD structures may be included in the payload of the advertising packet according to an embodiment of the present disclosure, and each may include a length part 1710 and a data part 1720. Information regarding a length of the data part 1720 may be included in the length part 1710. Substantial data that is to be broadcast by the BLE device 200 may be included in the data part 1720.

In this regard, according to an embodiment of the present disclosure, the data part 1720 may include an AD type 1721 and AD data 1722. A value for identifying a type of the AD data 1722 may be included in the AD type 1721. The AD type 1721 will now be described in more detail with reference to FIG. 18.

FIG. 18 is a table for explaining an AD type 1820, according to an embodiment of the present disclosure.

Referring to FIG. 18, the AD types 1820 that may be included in an advertising data packet may be diverse. For example, the AD types 1820 may include «Flags», «Incomplete List of 16-bit Service Class UUIDs», «Complete List of 16-bit Service Class UUIDs», «Incomplete List of 32-bit Service Class UUIDs», «Complete List of 32-bit Service Class UUIDs», «Incomplete List of 128-bit Service Class UUIDs», «Complete List of 128-bit Service Class UUIDs», «Shortened Local Name», «Complete Local Name», «TX Power Level», «Class of Device», «Simple Pairing Hash C», «Simple Pairing Randomizer R», «Device ID», «Security Manager TK Value», «Security Manager Out of Band Flags», «Slave Connection Interval Range», «List of 16-bit Service Solicitation UUIDs», «List of 128-bit Service Solicitation UUIDs», «Service Data», «Public Target Address», «Random Target Address», «Appearance», «Manufacturer Specific Data», and the like.

Meanwhile, the AD type 1820 may be expressed as a previously set value 1810 that may be included in the advertising data packet in such a way that a scanner (for example, the mobile terminal 100) may identify the AD type 1820. Meanwhile, one of ordinary skill in the art may obviously identify a definition 1830 of the AD type 1820 from a table of FIG. 18, and thus a detailed description of the definition 1830 of the AD types 1820 will be omitted here.

FIGS. 19A and 19B are a table for explaining data broadcast by the BLE device 200, according to an embodiment of the present disclosure.

Referring to FIGS. 19A and 19B, the BLE device 200 may broadcast necessary data by using a specific AD type 1910. For example, in a case where the BLE device 200 is a smart phone manufactured by Samsung Electronics Co., Ltd., the BLE device 200 may include and broadcast TX Power Level (e.g., +4 dBm), Shortened Local Name (e.g., GT-N8000, Samsung Mobile), Class of Device (e.g., Major: Phone, Minor: Smart phone, Service: Object Transfer), Random Target Address (e.g., Samsung Mobile), List of Service Solicitation UUIDs (e.g., 0X1105), Manufacturer Specific Data <<Protocol>> (e.g., 0X0075: a previously defined code indicating Samsung Electronics), Manufacturer Specific Data <<Capability>> (e.g., 0X00ff: Bluetooth BR/EDR, Bluetooth AMP, Bluetooth LE, WiFi, WiFi Direct, WiFi Display, DLSN(All-share), NFC, RFID support), Manufacturer Specific Data <<Sensor>> (e.g., 0X06000024: Temperature 36° C.), and Manufacturer Specific Data <<Others>> (e.g., Silent mode, Screen Rotation, Power Saving, Notification, Mobile Data, Driving mode, Sync mode, Privacy/Flight mode, etc. which indicate a current status of the BLE device 200) in an advertising data packet.

In this regard, since a length of AD is limited to 31 bytes, the BLE device 200 may broadcast only essential data by using an advertising data packet and additionally respond to optional data such as Local Name through SCAN RSP. Also, the advertising data packet according to an embodiment of the present disclosure may further include an encryption field.

Meanwhile, the BLE device 200 according to an embodiment of the present disclosure may broadcast property information (for example, information regarding a sensor included in the BLE device 200 or appearance color information of the BLE device 200) through the advertising data packet.

For example, in a case where the BLE device 200 is a blue tag including a temperature sensor, the BLE device 200 may include identification information (for example, "SAMSUNG_Temp_TAG001_blue") indicating property information in a UUID field or an MSD field thereof and may broadcast the identification information to the outside.

According to another embodiment of the present disclosure, the BLE device 200 may include and broadcast sensing information measured by a sensor in an MSD field. For example, in a case where the BLE device 200 includes the temperature sensor and a current temperature measured by the temperature sensor is 36° C., the BLE device 200 may include a code ("0X06000024") indicating that the temperature is 36° C. in the MSD <Sensor> field and may broadcast the code.

Meanwhile, the BLE device 200 according to an embodiment of the present disclosure may use a random device address, instead of a Bluetooth device address BD_ADDR or a MAC address, for privacy. Also, the BLE device 200 according to an embodiment of the present disclosure may have been previously included in a White/Black list before broadcasting the advertising packet and may disregard a connect request sent by an apparatus of an address that is not allowed. Also, the BLE device 200 may additionally perform an authentication operation on a scanner (for example, the mobile terminal 100) through an internal and external server and reinforce security. To the contrary, the mobile terminal 100 may perform the authentication operation on the BLE device 200 through the internal and external server.

Meanwhile, the BLE device 200 according to an embodiment of the present disclosure may adjust an advertising interval according to a state of the BLE device 200 such as stop, or move (walking or moving by vehicle, etc.) and increase connectivity to the mobile terminal 100. For example, the BLE device 200 may lengthen the advertising interval in a sleep mode and shorten the advertising interval while moving.

Also, the BLE device 200 according to an embodiment of the present disclosure may adjust a transmission (TX) power level for each status. For example, in a case where the BLE device 200 broadcasts data requiring security, the BLE device 200 may reduce the transmission (TX) power level.

FIG. 20 is a diagram illustrating an example of an AD packet according to an embodiment of the present disclosure.

Referring to FIG. 20, the total length of the AD is 29 bytes. If an AD "0X0000FFFF040201FF030075FF03840A-02303030384E5F54710809040102" is analyzed from the end thereof, the AD of 29 bytes may be divided into 6 AD structures.

In a first AD structure (①), "02" indicates a length (2 bytes) of an AD type and AD data, "01" indicates an AD type (Flags), and "04" indicates substantial data (LE and BR/EDR simultaneous availability (Host)).

In a second AD Structure (②), '09' indicates a length (9 bytes) of the AD type and the AD data, '08' indicates an AD type (Shortened Local Name), and '71 54 5F 4E 38 30 30 30' indicates substantial data (G T-N 8 0 0 0).

In a third AD Structure (③), '02' indicates a length (2 bytes) of the AD type and the AD data, 'OA' indicates an AD type (Tx Power Level), and '84' indicates substantial data (132(+4 dBm)).

In a fourth AD Structure (④), '03' indicates a length (3 bytes) of the AD type and the AD data, 'FF' indicates an AD type (Manufacturer Specific Data), and '75 00' indicates substantial data (Company ID: 0X0075=Samsung Electronics).

In a fifth AD Structure (⑤), '03' indicates a length (3 bytes) of the AD type and the AD data, 'FF' indicates an AD type (Manufacturer Specific Data), and '01 02' indicates substantial data (Protocol ID: 0X0201).

In a sixth AD Structure (⑥), '04' indicates a length (4 bytes) of the AD type and the AD data, 'FF' indicates an AD type (Manufacturer Specific Data), and 'FF 00 00' indicates substantial data (Capability state: 0X0000FF=Bluetooth BR/EDR, Bluetooth AMP, Bluetooth LE, WiFi, WiFi Direct, WiFi Display, DLSN(All-share), NFC, RFID support).

The embodiments of the present disclosure can be implemented in the form of executable program commands through a variety of computer means and recorded to non-transitory computer readable media. The computer readable media may include solely or in combination, program commands, data files and data structures. The program commands recorded to the media may be components specially designed for the present disclosure or may be usable by one of ordinary skill in the art of computer software. Computer readable recording media include magnetic media such as a hard disk, a floppy disk, and a magnetic tape, optical media such as Compact Disc-ROM (CD-ROM) and Digital Versatile Disc (DVD), magneto-optical media such as floptical disk, and hardware devices such as ROM, RAM, and flash memory specially designed to store and carry out programs. Program commands may include not only machine language code generated by a complier but also high level code that can be used by an interpreter etc., which is executed by a computer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a first electronic device, the method comprising:
enabling, by the first electronic device, wireless communication with a second electronic device using an encryption key, which is mutually registered with the first electronic device based on a random device address of the second electronic device that is not a Bluetooth device address (BD_ADDR), wherein the first electronic device is a mobile terminal, and the second electronic device is a Bluetooth low energy (BLE) device;
receiving, by the first electronic device, an advertising data packet from the second electronic device;
obtaining sensing information, from the advertising data packet, including motion data regarding a motion of an object that is obtained by the second electronic device post-processing sensor data corresponding to the motion of the object sensed at the second electronic device, wherein the sensing information is encrypted through the encryption key used to enable the wireless communication and included in the advertising data packet;

executing, by the first electronic device, a call application which corresponds to the sensing information regarding the motion of the object received from the second electronic device; and executing, by the first electronic device, a control command which is mapped with the sensing information regarding the motion of the object through the call application, by attempting to make a phone call to a device which is predefined.

2. The method of claim 1, wherein the control command comprises changing a mode of the first electronic device.

3. The method of claim 1, further comprising:
receiving, from a user via an input window of the first electronic device, an input of first user added information regarding the second electronic device, wherein the first user added information comprises at least one of an identifier (ID), a nickname, a category, a memo, or notification information which are input by the user to create a profile with regard to the second electronic device.

4. The method of claim 3, further comprising:
updating the first user added information based on the received sensing information.

5. The method of claim 3, wherein the receiving of the input of the first user added information comprises obtaining an image of an object, which corresponds to the second electronic device, through a camera.

6. The method of claim 1, further comprising:
receiving sensing information detected by the registered second electronic device from the registered second electronic device for a predetermined period; and
displaying the received sensing information.

7. The method of claim 1, further comprising:
determining information of a distance between the registered second electronic device and the first electronic device, based on a strength of a signal received from the registered second electronic device; and
displaying the determined distance information.

8. The method of claim 1, wherein the receiving the sensing information comprises, when a predetermined event is detected by the second electronic device, receiving the sensing information regarding the motion of the object to which the second electronic device is attached.

9. The method of claim 1, wherein the control command comprises outputting a notification regarding the received sensing information.

10. The method of claim 1, wherein the obtaining of the sensing information comprises obtaining the sensing information from a manufacturer specific data (MSD) field of the advertising data packet.

11. The method of claim 1, wherein the random device address of the second electronic device is not a media access control (MAC) address.

12. A first electronic device comprising:
a communication unit;
a memory storing instructions; and
at least one processor configured to execute the instructions stored in the memory to control to:
enable wireless communication with a second electronic device via the communication unit using an encryption key, which is mutually registered with the first electronic device based on a random device address of the second electronic device that is not a Bluetooth device address (BD_ADDR), wherein the first electronic device is a mobile terminal, and the second electronic device is a Bluetooth low energy (BLE) device,
receive, via the communication unit, an advertising data packet from the second electronic device,
obtaining sensing information, from the advertising data packet, including motion data regarding a motion of an object that is obtained by the second electronic device post-processing sensor data corresponding to the motion of the object sensed at the second electronic device, wherein the sensing information is encrypted through the encryption key used to enable the wireless communication and included in the advertising data packet,
execute a call application which corresponds to the sensing information regarding the motion of the object received from the second electronic device, and
execute a control command which is mapped with the sensing information regarding the motion of the object through the call application, by attempting to make a phone call to a device which is predefined.

13. The first electronic device of claim 12, wherein the control command comprises changing a mode of the first electronic device.

14. The first electronic device of claim 12, wherein the at least one processor is further configured to:
receive, from a user via an input window of the first electronic device, an input of first user added information regarding the second electronic device, wherein the first user added information comprises at least one of an identifier (ID), a nickname, a category, a memo, or notification information which are input by the user to create a profile with regard to the second electronic device.

15. The first electronic device of claim 14, wherein the at least one processor is further configured to update the first user added information based on the received sensing information.

16. The first electronic device of claim 12, wherein the at least one processor is further configured to:
receive sensing information detected by the registered second electronic device from the registered second electronic device for a predetermined period, and
display the received sensing information.

17. The first electronic device of claim 12, wherein the at least one processor is further configured to control to, when a predetermined event is detected by the second electronic device, receive the sensing information regarding the motion of the object to which the second electronic device is attached.

18. The first electronic device of claim 12, wherein the control command comprises outputting a notification regarding the received sensing information.

19. The first electronic device of claim 12, wherein the random device address of the second electronic device is not a media access control (MAC) address.

* * * * *